(12) United States Patent
Cui et al.

(10) Patent No.: US 11,310,286 B2
(45) Date of Patent: *Apr. 19, 2022

(54) MECHANISM FOR PROVIDING EXTERNAL ACCESS TO A SECURED NETWORKED VIRTUALIZATION ENVIRONMENT

(71) Applicant: Nutanix, Inc., San Jose, CA (US)

(72) Inventors: Miao Cui, New York, NY (US); Kshitiz Jain, Bangalore (IN); Vineet Kahlon, Princeton, NJ (US)

(73) Assignee: Nutanix, Inc., San Jose, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 16/747,272

(22) Filed: Jan. 20, 2020

(65) Prior Publication Data
US 2020/0177639 A1    Jun. 4, 2020

Related U.S. Application Data

(63) Continuation of application No. 14/708,091, filed on May 8, 2015, now Pat. No. 10,542,049.

(60) Provisional application No. 61/991,195, filed on May 9, 2014.

(51) Int. Cl.
*H04L 29/06* (2006.01)
*G06F 9/455* (2018.01)
*H04L 67/10* (2022.01)

(52) U.S. Cl.
CPC ........ *H04L 63/205* (2013.01); *G06F 9/45558* (2013.01); *H04L 63/029* (2013.01); *G06F 2009/45595* (2013.01); *H04L 67/10* (2013.01)

(58) Field of Classification Search
CPC ..... H04L 63/205; H04L 63/029; H04L 67/10; G06F 9/45558; G06F 2009/45595
See application file for complete search history.

(56) References Cited

U.S. PATENT DOCUMENTS

| | | |
|---|---|---|
| 5,253,252 A | 10/1993 | Tobol |
| 5,276,867 A | 1/1994 | Kenley et al. |
| 5,664,144 A | 9/1997 | Yanai et al. |
| 5,870,555 A | 2/1999 | Pruett et al. |
| 5,884,308 A | 3/1999 | Foulston |
| 6,055,543 A | 4/2000 | Christensen et al. |

(Continued)

FOREIGN PATENT DOCUMENTS

| | | |
|---|---|---|
| CN | 103746997 | 4/2014 |
| CN | 110519112 A | 11/2019 |

(Continued)

OTHER PUBLICATIONS

Non-final Office Action dated Jul. 7, 2015 for related U.S. Appl. No. 14/278,363.

(Continued)

*Primary Examiner* — Yonas A Bayou
(74) *Attorney, Agent, or Firm* — Vista IP Law Group, LLP

(57) ABSTRACT

A method for providing external access into a secured networked virtualization environment, includes performing a leadership election amongst nodes of the secured networked virtualization environment to elect a leader node, assigning a cluster virtual IP address to the leader node and generating a reverse tunnel, using a processor, by the leader node to allow for an external entity to communicate with the secured networked virtualization environment.

30 Claims, 14 Drawing Sheets

(56) References Cited

U.S. PATENT DOCUMENTS

| | | |
|---|---|---|
| 6,085,234 A | 7/2000 | Pitts et al. |
| 6,101,508 A | 8/2000 | Wolff |
| 6,212,531 B1 | 4/2001 | Blea et al. |
| 6,289,356 B1 | 9/2001 | Hitz et al. |
| 6,341,340 B1 | 1/2002 | Tsukerman et al. |
| 6,363,416 B1 | 3/2002 | Naeimi et al. |
| 6,442,602 B1 | 8/2002 | Choudhry |
| 6,684,397 B1 | 1/2004 | Byer et al. |
| 6,738,801 B1 | 5/2004 | Kawaguchi et al. |
| 6,928,589 B1 | 8/2005 | Pomaranski et al. |
| 6,963,914 B1 | 11/2005 | Breitbart et al. |
| 6,968,345 B1 | 11/2005 | Muhlestein |
| 7,120,631 B1 | 10/2006 | Vahalia et al. |
| 7,356,679 B1 | 4/2008 | Le et al. |
| 7,379,419 B2 | 5/2008 | Collins |
| 7,409,511 B2 | 8/2008 | Edwards et al. |
| 7,421,578 B1 * | 9/2008 | Huang .............. H04L 63/065 370/254 |
| 7,461,374 B1 | 12/2008 | Balint et al. |
| 7,606,868 B1 | 10/2009 | Le et al. |
| 7,647,427 B1 | 1/2010 | Devarapalli |
| 7,702,843 B1 | 4/2010 | Chen et al. |
| 7,720,864 B1 | 5/2010 | Muth et al. |
| 7,725,671 B2 | 5/2010 | Prahlad et al. |
| 7,752,492 B1 | 7/2010 | Armangau et al. |
| 7,774,391 B1 | 8/2010 | Le et al. |
| 7,805,469 B1 | 9/2010 | Nagaralu et al. |
| 7,805,511 B1 | 9/2010 | Panicker et al. |
| 7,840,533 B2 | 11/2010 | Prahlad et al. |
| 7,890,529 B1 | 2/2011 | Srinivasan et al. |
| 7,934,117 B2 | 4/2011 | Kakivaya et al. |
| 7,937,453 B1 | 5/2011 | Hayden et al. |
| 7,937,455 B2 | 5/2011 | Saha et al. |
| 7,941,470 B2 | 5/2011 | Le et al. |
| 7,990,962 B2 | 8/2011 | Chang et al. |
| 8,051,252 B2 | 11/2011 | Williams |
| 8,051,262 B2 | 11/2011 | Ichikawa et al. |
| 8,095,810 B2 | 1/2012 | Matsuzawa et al. |
| 8,095,931 B1 | 1/2012 | Chen et al. |
| 8,190,588 B1 | 5/2012 | Gupta et al. |
| 8,219,769 B1 | 7/2012 | Wilk |
| 8,352,482 B2 | 1/2013 | Hansen |
| 8,352,608 B1 | 1/2013 | Keagy et al. |
| 8,365,167 B2 | 1/2013 | Beaty et al. |
| 8,392,680 B1 | 3/2013 | Natanzon et al. |
| 8,407,448 B1 | 3/2013 | Hayden et al. |
| 8,424,003 B2 | 4/2013 | Degenaro et al. |
| 8,447,728 B2 | 5/2013 | Prahlad et al. |
| 8,473,462 B1 | 6/2013 | Banerjee |
| 8,473,775 B1 | 6/2013 | Helmick |
| 8,484,163 B1 | 7/2013 | Yucel et al. |
| 8,484,356 B1 | 7/2013 | Douglis et al. |
| 8,539,076 B2 | 9/2013 | Nakano et al. |
| 8,543,790 B2 | 9/2013 | Chen et al. |
| 8,549,518 B1 | 10/2013 | Aron |
| 8,601,471 B2 | 12/2013 | Beaty |
| 8,601,473 B1 * | 12/2013 | Aron .............. G06F 9/4881 718/1 |
| 8,635,351 B2 | 1/2014 | Astete et al. |
| 8,646,089 B2 | 2/2014 | Jayanthi et al. |
| 8,688,660 B1 | 4/2014 | Sivasubramanian et al. |
| 8,751,515 B1 | 6/2014 | Xing et al. |
| 8,762,335 B2 | 6/2014 | Prahlad et al. |
| 8,805,951 B1 | 8/2014 | Faibish et al. |
| 8,838,923 B2 | 9/2014 | Prahlad et al. |
| 8,850,130 B1 | 9/2014 | Aron et al. |
| 8,863,124 B1 | 10/2014 | Aron |
| 8,898,668 B1 | 11/2014 | Costea |
| 8,914,429 B2 | 12/2014 | Pitts |
| 8,935,563 B1 | 1/2015 | Rajaa et al. |
| 8,949,557 B2 | 2/2015 | Kamei et al. |
| 8,966,188 B1 | 2/2015 | Bardale |
| 8,983,952 B1 | 3/2015 | Zhang et al. |
| 8,996,783 B2 | 3/2015 | Huang et al. |
| 9,009,106 B1 | 4/2015 | Aron et al. |
| 9,032,248 B1 | 5/2015 | Petty |
| 9,043,567 B1 | 5/2015 | Modukuri et al. |
| 9,060,014 B2 | 6/2015 | Crowley |
| 9,069,708 B2 | 6/2015 | Gill et al. |
| 9,152,628 B1 | 10/2015 | Stacey et al. |
| 9,154,535 B1 | 10/2015 | Harris |
| 9,201,698 B2 | 12/2015 | Ashok et al. |
| 9,201,704 B2 | 12/2015 | Chang et al. |
| 9,201,887 B1 | 12/2015 | Earl et al. |
| 9,213,513 B2 | 12/2015 | Hartz et al. |
| 9,244,674 B2 | 1/2016 | Waterman et al. |
| 9,244,969 B1 | 1/2016 | Love et al. |
| 9,256,475 B1 | 2/2016 | Aron et al. |
| 9,256,612 B1 | 2/2016 | Bhatt et al. |
| 9,268,586 B2 | 2/2016 | Voccio et al. |
| 9,274,817 B1 | 3/2016 | Fan et al. |
| 9,286,298 B1 | 3/2016 | Gillett, Jr. |
| 9,286,344 B1 | 3/2016 | Bhardwaj et al. |
| 9,292,327 B1 | 3/2016 | Von Thenen et al. |
| 9,336,132 B1 | 5/2016 | Aron et al. |
| 9,348,702 B2 | 5/2016 | Hsu et al. |
| 9,389,887 B1 | 7/2016 | Aron et al. |
| 9,405,566 B2 | 8/2016 | Chawla et al. |
| 9,411,628 B2 | 8/2016 | Bezbaruah et al. |
| 9,448,887 B1 | 9/2016 | Ben Dayan et al. |
| 9,497,257 B1 | 11/2016 | Love et al. |
| 9,513,946 B2 | 12/2016 | Sevigny et al. |
| 9,519,596 B2 | 12/2016 | Coppola et al. |
| 9,535,907 B1 | 1/2017 | Stringham |
| 9,563,555 B2 | 2/2017 | Flynn et al. |
| 9,571,561 B2 | 2/2017 | Jang |
| 9,619,257 B1 | 4/2017 | Aron et al. |
| 9,634,990 B2 | 4/2017 | Lee |
| 9,639,588 B2 | 5/2017 | Cheng |
| 9,652,265 B1 | 5/2017 | Narayanasamy et al. |
| 9,690,670 B1 | 6/2017 | Paulzagade et al. |
| 9,740,436 B2 | 8/2017 | Fiebrich-Kandler et al. |
| 9,740,723 B2 | 8/2017 | Prahlad et al. |
| 9,747,287 B1 | 8/2017 | Bhardwaj et al. |
| 9,772,866 B1 | 9/2017 | Aron et al. |
| 9,832,136 B1 | 11/2017 | Gibson |
| 9,846,706 B1 | 12/2017 | Basov et al. |
| 9,853,978 B2 | 12/2017 | Tellvik et al. |
| 9,870,291 B2 | 1/2018 | Bezbaruah et al. |
| 9,893,988 B2 | 2/2018 | Agarwal et al. |
| 9,898,522 B2 | 2/2018 | Cole et al. |
| 9,940,154 B2 | 4/2018 | Ramani et al. |
| 9,946,573 B2 | 4/2018 | Mcdermott |
| 10,009,215 B1 | 6/2018 | Shorey |
| 10,050,862 B2 | 8/2018 | Nambiar et al. |
| 10,083,022 B2 | 9/2018 | Fukui et al. |
| 10,084,873 B2 | 9/2018 | Dornemann |
| 10,095,506 B2 | 10/2018 | Gopalapura Venkatesh et al. |
| 10,101,989 B2 | 10/2018 | Sinha et al. |
| 10,114,706 B1 | 10/2018 | Chougala et al. |
| 10,127,059 B2 | 11/2018 | Astete et al. |
| 10,140,115 B2 | 11/2018 | Fukui et al. |
| 10,152,233 B2 | 12/2018 | Xu et al. |
| 10,210,048 B2 | 2/2019 | Sancheti |
| 10,210,172 B1 | 2/2019 | Konig et al. |
| 10,248,657 B2 | 4/2019 | Prahlad et al. |
| 10,367,753 B2 | 7/2019 | Schultze et al. |
| 10,394,547 B2 | 8/2019 | Fukui et al. |
| 10,419,426 B2 | 9/2019 | Bakshan et al. |
| 10,523,592 B2 | 12/2019 | Byers et al. |
| 10,530,742 B2 | 1/2020 | Shah et al. |
| 10,534,634 B2 | 1/2020 | Yang et al. |
| 10,540,164 B2 | 1/2020 | Bafna et al. |
| 10,540,165 B2 | 1/2020 | Bafna et al. |
| 10,540,166 B2 | 1/2020 | Arikatla et al. |
| 10,719,305 B2 | 7/2020 | Sinha et al. |
| 10,719,306 B2 | 7/2020 | Deshmukh et al. |
| 10,719,307 B2 | 7/2020 | Kanada et al. |
| 10,728,090 B2 | 7/2020 | Deshmukh et al. |
| 10,809,998 B2 | 10/2020 | Gopalapura Venkatesh et al. |
| 10,824,455 B2 | 11/2020 | Arikatla et al. |
| 10,831,465 B2 | 11/2020 | Sharpe et al. |
| 10,838,708 B2 | 11/2020 | Sinha et al. |
| 2002/0120763 A1 | 8/2002 | Miloushev et al. |

(56) References Cited

U.S. PATENT DOCUMENTS

| | | |
|---|---|---|
| 2002/0133491 A1* | 9/2002 | Sim .................... H04L 67/1023 |
| 2003/0115218 A1 | 6/2003 | Bobbitt et al. |
| 2003/0163597 A1 | 8/2003 | Hellman et al. |
| 2003/0195942 A1 | 10/2003 | Muhlestein et al. |
| 2004/0054777 A1 | 3/2004 | Ackaouy et al. |
| 2004/0210591 A1 | 10/2004 | Hirschfeld et al. |
| 2004/0267832 A1 | 12/2004 | Wong et al. |
| 2005/0094574 A1 | 5/2005 | Han et al. |
| 2005/0120160 A1 | 6/2005 | Plouffe et al. |
| 2005/0120180 A1 | 6/2005 | Schornbach et al. |
| 2005/0125503 A1 | 6/2005 | Iyengar et al. |
| 2005/0193245 A1 | 9/2005 | Hayden et al. |
| 2005/0201272 A1 | 9/2005 | Wang et al. |
| 2005/0210461 A1 | 9/2005 | Srivastava et al. |
| 2005/0226059 A1 | 10/2005 | Kavuri et al. |
| 2005/0228798 A1 | 10/2005 | Shepard et al. |
| 2005/0268298 A1 | 12/2005 | Hunt et al. |
| 2006/0010227 A1 | 1/2006 | Atluri |
| 2006/0047685 A1 | 3/2006 | Dearing et al. |
| 2006/0069912 A1 | 3/2006 | Zheng et al. |
| 2006/0080657 A1 | 4/2006 | Goodman |
| 2006/0136781 A1 | 6/2006 | Lamport |
| 2006/0206901 A1 | 9/2006 | Chan |
| 2006/0224918 A1 | 10/2006 | Koike |
| 2006/0225065 A1 | 10/2006 | Chandhok et al. |
| 2007/0022129 A1 | 1/2007 | Bahar et al. |
| 2007/0038913 A1 | 2/2007 | Allen et al. |
| 2007/0100905 A1 | 5/2007 | Masters et al. |
| 2007/0171921 A1 | 7/2007 | Wookey et al. |
| 2007/0271561 A1 | 11/2007 | Winner et al. |
| 2007/0300220 A1 | 12/2007 | Seliger et al. |
| 2008/0098194 A1 | 4/2008 | Hashimoto et al. |
| 2008/0104589 A1 | 5/2008 | Mccrory et al. |
| 2008/0133486 A1 | 6/2008 | Fitzgerald et al. |
| 2008/0134178 A1 | 6/2008 | Fitzgerald et al. |
| 2008/0189468 A1 | 8/2008 | Schmidt et al. |
| 2008/0201414 A1 | 8/2008 | Amir et al. |
| 2008/0201457 A1 | 8/2008 | London |
| 2008/0208938 A1 | 8/2008 | Lin et al. |
| 2008/0270677 A1 | 10/2008 | Kolakowski |
| 2008/0320499 A1 | 12/2008 | Suit |
| 2008/0320583 A1 | 12/2008 | Sharma et al. |
| 2009/0006801 A1 | 1/2009 | Shultz et al. |
| 2009/0100248 A1 | 4/2009 | Kami |
| 2009/0113034 A1* | 4/2009 | Krishnappa ............. G06F 15/16 709/223 |
| 2009/0144720 A1 | 6/2009 | Roush et al. |
| 2009/0158082 A1 | 6/2009 | Jain et al. |
| 2009/0171971 A1 | 7/2009 | Goddard et al. |
| 2009/0193272 A1 | 7/2009 | Matsuzawa et al. |
| 2009/0216975 A1 | 8/2009 | Halperin et al. |
| 2009/0248870 A1 | 10/2009 | Kamei et al. |
| 2009/0249470 A1 | 10/2009 | Litvin et al. |
| 2009/0271412 A1 | 10/2009 | Lacapra et al. |
| 2009/0287887 A1 | 11/2009 | Matsuki et al. |
| 2009/0288084 A1 | 11/2009 | Astete et al. |
| 2009/0290572 A1 | 11/2009 | Gonia et al. |
| 2010/0042869 A1 | 2/2010 | Szabo et al. |
| 2010/0070725 A1 | 3/2010 | Prahlad et al. |
| 2010/0082716 A1 | 4/2010 | Agetsuma et al. |
| 2010/0082774 A1 | 4/2010 | Pitts |
| 2010/0095289 A1 | 4/2010 | Nguyen et al. |
| 2010/0110150 A1 | 5/2010 | Xu et al. |
| 2010/0138921 A1 | 6/2010 | Na et al. |
| 2010/0162226 A1 | 6/2010 | Borissov et al. |
| 2010/0174745 A1 | 7/2010 | Ryan et al. |
| 2010/0214908 A1 | 8/2010 | Ralev |
| 2010/0241785 A1 | 9/2010 | Chen et al. |
| 2010/0262717 A1 | 10/2010 | Critchley |
| 2010/0275205 A1 | 10/2010 | Nakajima |
| 2011/0022694 A1 | 1/2011 | Dalal et al. |
| 2011/0022695 A1 | 1/2011 | Dalal et al. |
| 2011/0022812 A1 | 1/2011 | Van et al. |
| 2011/0022883 A1 | 1/2011 | Hansen |
| 2011/0047340 A1 | 2/2011 | Olson et al. |
| 2011/0078318 A1 | 3/2011 | Desai et al. |
| 2011/0107135 A1 | 5/2011 | Andrews et al. |
| 2011/0119763 A1 | 5/2011 | Wade et al. |
| 2011/0125835 A1 | 5/2011 | Soltis |
| 2011/0161299 A1 | 6/2011 | Prahlad et al. |
| 2011/0173493 A1 | 7/2011 | Armstrong et al. |
| 2011/0179414 A1 | 7/2011 | Goggin et al. |
| 2011/0184993 A1 | 7/2011 | Chawla |
| 2011/0185292 A1 | 7/2011 | Chawla et al. |
| 2011/0225574 A1 | 9/2011 | Khalidi et al. |
| 2011/0239213 A1 | 9/2011 | Aswani et al. |
| 2011/0252208 A1 | 10/2011 | Ali et al. |
| 2011/0255538 A1 | 10/2011 | Srinivasan et al. |
| 2011/0265076 A1 | 10/2011 | Thorat et al. |
| 2011/0271279 A1 | 11/2011 | Pate |
| 2011/0276578 A1 | 11/2011 | Allalouf et al. |
| 2011/0276963 A1 | 11/2011 | Wu et al. |
| 2011/0283277 A1 | 11/2011 | Castillo et al. |
| 2011/0289561 A1 | 11/2011 | Ivanov et al. |
| 2011/0307729 A1 | 12/2011 | Matsuzawa et al. |
| 2011/0320690 A1 | 12/2011 | Petersen et al. |
| 2012/0017114 A1 | 1/2012 | Timashev et al. |
| 2012/0023495 A1 | 1/2012 | Machida |
| 2012/0030456 A1 | 2/2012 | Wu et al. |
| 2012/0054736 A1 | 3/2012 | Arcese et al. |
| 2012/0078948 A1 | 3/2012 | Darcy |
| 2012/0081395 A1 | 4/2012 | Adi et al. |
| 2012/0084381 A1 | 4/2012 | Alladi et al. |
| 2012/0117555 A1 | 5/2012 | Banerjee et al. |
| 2012/0166866 A1 | 6/2012 | Rao et al. |
| 2012/0222089 A1* | 8/2012 | Whelan ............... H04L 63/1425 726/3 |
| 2012/0233463 A1 | 9/2012 | Holt et al. |
| 2012/0233608 A1 | 9/2012 | Toeroe |
| 2012/0243795 A1 | 9/2012 | Head et al. |
| 2012/0254342 A1 | 10/2012 | Evans |
| 2012/0254445 A1 | 10/2012 | Kawamoto et al. |
| 2012/0266162 A1 | 10/2012 | Baron |
| 2012/0266231 A1* | 10/2012 | Spiers .................... H04L 67/10 726/12 |
| 2012/0272237 A1 | 10/2012 | Baron |
| 2012/0290630 A1 | 11/2012 | Aizman et al. |
| 2012/0310892 A1 | 12/2012 | Dam et al. |
| 2012/0317142 A1 | 12/2012 | Broecheler et al. |
| 2012/0324183 A1 | 12/2012 | Chiruvolu et al. |
| 2013/0007741 A1 | 1/2013 | Britsch et al. |
| 2013/0036323 A1 | 2/2013 | Goose et al. |
| 2013/0046740 A1 | 2/2013 | Li et al. |
| 2013/0054973 A1* | 2/2013 | Fok ....................... H04W 12/04 713/176 |
| 2013/0055018 A1 | 2/2013 | Joshi et al. |
| 2013/0061110 A1 | 3/2013 | Zvibel |
| 2013/0061167 A1 | 3/2013 | Rhodes et al. |
| 2013/0066930 A1 | 3/2013 | Kamei et al. |
| 2013/0117744 A1 | 5/2013 | Klein et al. |
| 2013/0132674 A1 | 5/2013 | Sundrani |
| 2013/0138995 A1 | 5/2013 | Sivaramakrishnan et al. |
| 2013/0151888 A1 | 6/2013 | Bhattiprolu et al. |
| 2013/0152077 A1 | 6/2013 | Leitman et al. |
| 2013/0152085 A1 | 6/2013 | Amore et al. |
| 2013/0174246 A1* | 7/2013 | Schrecker ........... H04L 63/1433 726/14 |
| 2013/0185716 A1 | 7/2013 | Yin et al. |
| 2013/0198738 A1 | 8/2013 | Reddin et al. |
| 2013/0212345 A1 | 8/2013 | Nakajima |
| 2013/0219030 A1 | 8/2013 | Szabo |
| 2013/0227379 A1 | 8/2013 | Gupta et al. |
| 2013/0227550 A1 | 8/2013 | Weinstein et al. |
| 2013/0227552 A1 | 8/2013 | Reddin et al. |
| 2013/0227566 A1 | 8/2013 | Higuchi et al. |
| 2013/0232491 A1 | 9/2013 | Radhakrishnan et al. |
| 2013/0235774 A1* | 9/2013 | Jo ....................... H04W 52/0219 370/311 |
| 2013/0246705 A1 | 9/2013 | Diare |
| 2013/0247036 A1 | 9/2013 | Fujiwara |
| 2013/0262396 A1 | 10/2013 | Kripalani et al. |
| 2013/0283267 A1 | 10/2013 | Cooper et al. |
| 2013/0297869 A1 | 11/2013 | Mills et al. |
| 2013/0304694 A1 | 11/2013 | Barreto et al. |

(56) References Cited

U.S. PATENT DOCUMENTS

| | | |
|---|---|---|
| 2013/0332771 A1 | 12/2013 | Salapura et al. |
| 2014/0006708 A1 | 1/2014 | Huynh et al. |
| 2014/0025796 A1 | 1/2014 | Vibhor et al. |
| 2014/0052877 A1* | 2/2014 | Mao .................... H04L 12/4641 709/245 |
| 2014/0059392 A1 | 2/2014 | Ren et al. |
| 2014/0068612 A1 | 3/2014 | Torrey |
| 2014/0068711 A1* | 3/2014 | Schweitzer, III ..... G06F 21/606 726/3 |
| 2014/0089259 A1 | 3/2014 | Cheng |
| 2014/0095544 A1 | 4/2014 | Eshel et al. |
| 2014/0095555 A1 | 4/2014 | Kim et al. |
| 2014/0095816 A1 | 4/2014 | Hsu et al. |
| 2014/0101649 A1 | 4/2014 | Kamble |
| 2014/0109172 A1* | 4/2014 | Barton ................ H04L 63/0807 726/1 |
| 2014/0115182 A1 | 4/2014 | Sabaa et al. |
| 2014/0123138 A1 | 5/2014 | Lee et al. |
| 2014/0143831 A1* | 5/2014 | Fieweger ................ G06F 21/64 726/3 |
| 2014/0146055 A1 | 5/2014 | Bala et al. |
| 2014/0149794 A1 | 5/2014 | Shetty et al. |
| 2014/0149983 A1 | 5/2014 | Bonilla et al. |
| 2014/0164831 A1 | 6/2014 | Merriman et al. |
| 2014/0173199 A1 | 6/2014 | Gupta et al. |
| 2014/0181116 A1 | 6/2014 | Wang |
| 2014/0188808 A1 | 7/2014 | Wolf et al. |
| 2014/0189685 A1 | 7/2014 | Kripalani |
| 2014/0189686 A1 | 7/2014 | Masters et al. |
| 2014/0196038 A1 | 7/2014 | Kottomtharayil et al. |
| 2014/0201725 A1 | 7/2014 | Tian et al. |
| 2014/0207824 A1 | 7/2014 | Brandwine et al. |
| 2014/0222953 A1 | 8/2014 | Karve et al. |
| 2014/0230024 A1 | 8/2014 | Uehara et al. |
| 2014/0237464 A1 | 8/2014 | Waterman et al. |
| 2014/0250300 A1 | 9/2014 | Runkis et al. |
| 2014/0279909 A1 | 9/2014 | Am et al. |
| 2014/0310710 A1 | 10/2014 | Lubsey et al. |
| 2014/0359612 A1 | 12/2014 | D'Amato et al. |
| 2015/0006788 A1 | 1/2015 | Liu et al. |
| 2015/0007180 A1 | 1/2015 | Sharp et al. |
| 2015/0026682 A1 | 1/2015 | Singh et al. |
| 2015/0032690 A1 | 1/2015 | Hoque et al. |
| 2015/0039763 A1 | 2/2015 | Chaudhary et al. |
| 2015/0039837 A1 | 2/2015 | Quan et al. |
| 2015/0058298 A1 | 2/2015 | Earl et al. |
| 2015/0081644 A1 | 3/2015 | Pitts |
| 2015/0095788 A1 | 4/2015 | Thiele et al. |
| 2015/0106325 A1 | 4/2015 | Cole et al. |
| 2015/0106802 A1 | 4/2015 | Ivanov et al. |
| 2015/0142745 A1 | 5/2015 | Tekade et al. |
| 2015/0142747 A1 | 5/2015 | Zou |
| 2015/0178019 A1 | 6/2015 | Hegdal et al. |
| 2015/0205618 A1 | 7/2015 | Bailey et al. |
| 2015/0205639 A1 | 7/2015 | Matsumoto et al. |
| 2015/0213032 A1 | 7/2015 | Powell et al. |
| 2015/0220324 A1 | 8/2015 | Arcese et al. |
| 2015/0242291 A1 | 8/2015 | Chang et al. |
| 2015/0244802 A1 | 8/2015 | Simoncelli |
| 2015/0278046 A1 | 10/2015 | Zellermayer et al. |
| 2015/0293830 A1 | 10/2015 | Bhide et al. |
| 2015/0293896 A1 | 10/2015 | Runkis et al. |
| 2015/0301903 A1 | 10/2015 | Mutha et al. |
| 2015/0032653 A1 | 11/2015 | Cui et al. |
| 2015/0324217 A1 | 11/2015 | Shilmover et al. |
| 2015/0326531 A1 | 11/2015 | Cui et al. |
| 2015/0331757 A1 | 11/2015 | Durge et al. |
| 2015/0347775 A1 | 12/2015 | Bie et al. |
| 2016/0034555 A1 | 2/2016 | Rahut et al. |
| 2016/0050118 A1 | 2/2016 | Blanco et al. |
| 2016/0057009 A1 | 2/2016 | Kadayam et al. |
| 2016/0070492 A1 | 3/2016 | Cherubini et al. |
| 2016/0077936 A1 | 3/2016 | Tang et al. |
| 2016/0078068 A1 | 3/2016 | Agrawal et al. |
| 2016/0085480 A1 | 3/2016 | Chiu et al. |
| 2016/0085574 A1 | 3/2016 | Dornemann et al. |
| 2016/0087861 A1 | 3/2016 | Kuan et al. |
| 2016/0110214 A1 | 4/2016 | Vincent et al. |
| 2016/0110267 A1 | 4/2016 | Earl et al. |
| 2016/0124665 A1 | 5/2016 | Jain et al. |
| 2016/0162371 A1 | 6/2016 | Prabhu et al. |
| 2016/0171241 A1 | 6/2016 | Yun |
| 2016/0179419 A1 | 6/2016 | Yamaguchi et al. |
| 2016/0188232 A1 | 6/2016 | Ramachandran et al. |
| 2016/0188407 A1 | 6/2016 | Bronnikov et al. |
| 2016/0202916 A1 | 7/2016 | Cui et al. |
| 2016/0203008 A1 | 7/2016 | Cui et al. |
| 2016/0204977 A1 | 7/2016 | Cui et al. |
| 2016/0216993 A1 | 7/2016 | Beckwith et al. |
| 2016/0224363 A1 | 8/2016 | Joy |
| 2016/0301766 A1 | 10/2016 | Ionescu et al. |
| 2016/0328226 A1 | 11/2016 | Arya et al. |
| 2016/0335134 A1 | 11/2016 | Gupta et al. |
| 2016/0359697 A1 | 12/2016 | Scheib et al. |
| 2016/0359955 A1 | 12/2016 | Gill et al. |
| 2016/0378528 A1 | 12/2016 | Zamir |
| 2016/0378616 A1 | 12/2016 | Wigmore et al. |
| 2017/0004131 A1 | 1/2017 | Ben Dayan et al. |
| 2017/0005990 A1 | 1/2017 | Birger et al. |
| 2017/0012904 A1 | 1/2017 | Matzek et al. |
| 2017/0024152 A1 | 1/2017 | Bhagi et al. |
| 2017/0024224 A1 | 1/2017 | Bakke et al. |
| 2017/0039078 A1 | 2/2017 | Chen et al. |
| 2017/0039218 A1 | 2/2017 | Prahlad et al. |
| 2017/0048223 A1 | 2/2017 | Anantha Padmanaban et al. |
| 2017/0068469 A1 | 3/2017 | Shankar et al. |
| 2017/0075921 A1 | 3/2017 | Benton et al. |
| 2017/0090776 A1 | 3/2017 | Kowles |
| 2017/0091047 A1 | 3/2017 | Bangalore et al. |
| 2017/0094002 A1 | 3/2017 | Kumar et al. |
| 2017/0109184 A1 | 4/2017 | Ramani et al. |
| 2017/0160983 A1 | 6/2017 | Fiske et al. |
| 2017/0177638 A1 | 6/2017 | Bhosale et al. |
| 2017/0206074 A1 | 7/2017 | Arcese et al. |
| 2017/0206207 A1 | 7/2017 | Bondurant et al. |
| 2017/0214738 A1 | 7/2017 | Agarwal et al. |
| 2017/0220661 A1 | 8/2017 | Cao et al. |
| 2017/0235507 A1 | 8/2017 | Sinha et al. |
| 2017/0235562 A1 | 8/2017 | Bafna et al. |
| 2017/0235563 A1 | 8/2017 | Bafna et al. |
| 2017/0235589 A1 | 8/2017 | Gopalapura Venkatesh et al. |
| 2017/0235590 A1 | 8/2017 | Sinha et al. |
| 2017/0235591 A1 | 8/2017 | Kanada et al. |
| 2017/0235653 A1 | 8/2017 | Arikatla et al. |
| 2017/0235654 A1 | 8/2017 | Deshmukh et al. |
| 2017/0235751 A1 | 8/2017 | Gupta et al. |
| 2017/0235758 A1 | 8/2017 | Gopalapura Venkatesh et al. |
| 2017/0235760 A1 | 8/2017 | Sharpe et al. |
| 2017/0235761 A1 | 8/2017 | Bafna et al. |
| 2017/0235762 A1 | 8/2017 | Sharpe et al. |
| 2017/0235763 A1 | 8/2017 | Gopalapura Venkatesh et al. |
| 2017/0235764 A1 | 8/2017 | Sharpe et al. |
| 2017/0235950 A1 | 8/2017 | Gopalapura Venkatesh et al. |
| 2017/0242599 A1 | 8/2017 | Patnaik et al. |
| 2017/0262346 A1 | 9/2017 | Pradhan et al. |
| 2017/0277556 A1 | 9/2017 | Ishii et al. |
| 2017/0277903 A1 | 9/2017 | Christodorescu et al. |
| 2017/0279674 A1 | 9/2017 | Zhu |
| 2017/0286228 A1 | 10/2017 | Redko et al. |
| 2017/0302589 A1 | 10/2017 | Leafe et al. |
| 2018/0004766 A1 | 1/2018 | Darling |
| 2018/0062993 A1 | 3/2018 | Wu et al. |
| 2018/0129426 A1 | 5/2018 | Aron et al. |
| 2018/0143845 A1 | 5/2018 | Chawla et al. |
| 2018/0157521 A1 | 6/2018 | Arikatla et al. |
| 2018/0157522 A1 | 6/2018 | Bafna et al. |
| 2018/0157561 A1 | 6/2018 | Venkatesh et al. |
| 2018/0157677 A1 | 6/2018 | Bafna et al. |
| 2018/0157752 A1 | 6/2018 | Arikatla et al. |
| 2018/0157860 A1 | 6/2018 | Nair et al. |
| 2018/0159729 A1 | 6/2018 | Deshmukh et al. |
| 2018/0159826 A1 | 6/2018 | Yisan et al. |
| 2018/0173731 A1 | 6/2018 | Nazari et al. |
| 2018/0205787 A1 | 7/2018 | Ben Dayan et al. |

(56) References Cited

U.S. PATENT DOCUMENTS

| | | |
|---|---|---|
| 2018/0278602 A1 | 9/2018 | Koushik et al. |
| 2018/0332105 A1 | 11/2018 | Huang et al. |
| 2018/0357251 A1 | 12/2018 | Kumarasamy et al. |
| 2019/0026101 A1 | 1/2019 | Gopalapura Venkatesh et al. |
| 2019/0079747 A1 | 3/2019 | Sinha et al. |
| 2019/0129808 A1 | 5/2019 | Acharya et al. |
| 2019/0196718 A1 | 6/2019 | Pai et al. |
| 2019/0207925 A1 | 7/2019 | Anantha Padmanaban et al. |
| 2019/0286832 A1 | 9/2019 | Szeto et al. |
| 2019/0332683 A1 | 10/2019 | Thummala et al. |
| 2020/0007530 A1 | 1/2020 | Mohamad Abdul et al. |
| 2020/0036647 A1 | 1/2020 | Gupta et al. |
| 2020/0081704 A1 | 3/2020 | Bafna et al. |
| 2020/0106669 A1 | 4/2020 | Dhillon et al. |
| 2020/0274869 A1 | 8/2020 | Tahenakos et al. |

FOREIGN PATENT DOCUMENTS

| | | |
|---|---|---|
| EP | 1 229 443 A2 | 8/2002 |
| WO | WO 2010050944 | 5/2010 |
| WO | WO 2011078646 A1 | 6/2011 |
| WO | WO 2014200564 A1 | 12/2014 |
| WO | WO 2016018446 | 2/2016 |
| WO | WO 2020180291 A1 | 9/2020 |

OTHER PUBLICATIONS

Non-final Office Action dated Jul. 16, 2015 for related U.S. Appl. No. 14/584,466.

International Search Report and Written Opinion dated Aug. 20, 2015, for related PCT Patent Application No. PCT/US15/31096, 8 pages.

International Search Report and Written Opinion dated Aug. 26, 2015, for related PCT Patent Application No. PCT/US15/31096, 8 pages.

Final Office Action dated Feb. 25, 2016 for related U.S. Appl. No. 14/584,466.

Final Office Action dated Mar. 23, 2016 for related U.S. Appl. No. 14/278,363.

Notice Of Allowance and Fee(s) due dated Jul. 19, 2016 for related U.S. Appl. No. 14/206,869.

Lamport, Leslie "Paxos Made Simple," dated Nov. 1, 2001, 14 pages.

Alexander Shraer, et al., "Dynamic Reconfiguration of Primary/Backup Clusters," dated 2011, 13 pages.

Notice of Allowance and Fee(s) due dated Oct. 30, 2015 for related U.S. Appl. No. 14/144,520.

Wikipedia, "Compare-and-swap," Nov. 9, 2015, 6 pages.

International Search Report and Written Opinion dated Aug. 7, 2015, for corresponding PCT Patent Application No. PCT/US2015/030026, 10 pages.

Non-final Office Action dated Jul. 17, 2015 for related U.S. Appl. No. 14/206,869.

PCT International Search Report and Written Opinion dated Jun. 15, 2015 for related PCT Patent Application No. PCT/US2015/020139.

Final Office Action dated Jan. 25, 2016 for related U.S. Appl. No. 14/206,869.

Non-final Office Action dated Sep. 22, 2016 for related U.S. Appl. No. 14/584,466.

Citrix, "Citrix XenServer 6.0 Administrator's Guide", Copyright 2012 Citrix Systems, Inc., 207 pages (PCM Nutanix-023 ref).

John L Hufferd, Hufferd Enterprises, SNIA, "IP Storage Protocols: iSCSI", Copyright 2011 Storage Networking Industry Association, 46 pages (PCM Nutanix-032 ref).

Vmware, Technical White Paper, "Multipathing Configuration for Software iSCSI Using Port Binding", Copyright 2012 Vmware, Inc., 15 pages (PCM Nutanix-032 ref).

Non-final Office Action dated Oct. 7, 2016 for related U.S. Appl. No. 14/278,363.

Notice of Allowance and Fee(s) due dated Oct. 24, 2016 for related U.S. Appl. No. 14/206,869.

Non-final Office Action dated Nov. 1, 2016 for related U.S. Appl. No. 14/708,091.

Notice of Allowance and Fee(s) due dated Apr. 5, 2017 for related U.S. Appl. No. 14/584,466.

Ajmani et al., "Scheduling and Simulation: How to Upgrade Distributed Systems," HotOS IX: The 9th Workshop on Hot Topics in Operating Systems, USENIX, 2003, pp. 43-48.

Kochut, Andrzej and Alexei Karve, "Leveraging Local Image Redundancy for Efficient Virtual Machine Provisioning," 2012 IEEE Network Operations and Management Symposium, Jun. 8, 2012, pp. 179-187.

Soules et al.; "Metadata Efficiency in a Comprehensive Versioning File System", May 2002, CMU-CS-02-145, School of Computer Science, Carnegie Mellon University, Pittsburgh, PA 15213, 33 pages.

Notice of Allowance and Fee(s) due dated Apr. 10, 2017 for related U.S. Appl. No. 14/278,363.

Final Office Action dated Apr. 20, 2017 for related U.S. Appl. No. 14/708,091.

Notice of Allowance and Fee(s) due dated May 15, 2017 for related U.S. Appl. No. 15/069,961.

Non-Final Office Action dated Jan. 26, 2017 for related U.S. Appl. No. 15/069,961.

Non-Final Office Action dated Jul. 12, 2017 for related U.S. Appl. No. 14/610,285.

European Search Report dated May 5, 2017 for related EP Application No. 15792334.3, 13 pages.

European Search Report dated May 19, 2017 for related EP Application No. 15788922.1, 11 pages.

Non-Final Office Action dated Aug. 24, 2017 for related U.S. Appl. No. 14/708,091.

Final Office Action dated Jan. 9, 2018 for related U.S. Appl. No. 14/610,285.

European Extended Search Report dated Jan. 15, 2018 for related EP Application No. 15762234.1, 19 pages.

Final Office Action dated Feb. 27, 2018 for related U.S. Appl. No. 14/708,091.

Advisory Action dated May 18, 2018 for related U.S. Appl. No. 14/708,091.

Non-Final Office Action dated Jun. 7, 2018 for related U.S. Appl. No. 15/294,422.

Non-Final Office Action dated Jun. 29, 2018 for related U.S. Appl. No. 15/160,347.

Notice of Allowance dated Sep. 6, 2018 for related U.S. Appl. No. 14/708,091, 8 pages.

First Office Action dated Jul. 30, 2018 for related European Application No. 15762234.1, 6 pages.

Non-Final Office Action dated Nov. 14, 2018 for related U.S. Appl. No. 15/678,893, 7 pages.

Notice of Allowance dated Nov. 20, 2018 for related U.S. Appl. No. 15/294,422, 7 pages.

Intention to Grant dated Jan. 3, 2019 for related EP Application No. 15792334.3, 7 pages.

Final Office Action dated Jan. 28, 2019 for related U.S. Appl. No. 15/160,347, 16 pages.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

(56) References Cited

OTHER PUBLICATIONS

Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Notice of Allowance dated Mar. 20, 2019 for related U.S. Appl. No. 15/678,893, 5 pages.
Notice of Allowance dated Mar. 26, 2019 for related U.S. Appl. No. 15/294,422, 7 pages.
Non-Final Office Action dated Sep. 6, 2019 for related U.S. Appl. No. 15/160,347.
Notice of Allowance dated Nov. 19, 2019 for related U.S. Appl. No. 14/708,091.
Notice of Allowance dated Dec. 27, 2019 for related U.S. Appl. No. 14/610,285.
Final Office Action dated Mar. 16, 2020 for related U.S. Appl. No. 15/160,347.
E.S., "Nutanix Two-Node Clusters", (Jun. 18, 2018), from http://vpash.com/nutanix/nutanix-two-node-clusters/, pp. all.
Configuring a Witness (two-node cluster) (Jul. 16, 2018), 3 pages.
Gupta, Upasna. "Unlocking the ROBO/Edge IT Landscape with the Launch of Nutanix 1-node Cluster" (Jan. 19, 2018), 7 pages.
Liu, M. "Fine-Grained Replicated State Machines for a Cluster Storage System", in the Proceedings of the 17th USENIX Symposium on Networked Systems Design and Implementation (NSDI '20), (Feb. 25-27, 2020).
Junqueira, F. P., "Zab: High-performance broadcast for primary-backup systems", 2011 IEEE/IFIP 41st International Conference on Dependable Systems & Networks (DSN), (Jun. 27-30, 2011).
Redis, "Redis Sentinel Documentation", (Jul. 23, 2012), date retrieved from google.
Rabbitmq, "Quorum Queues", (Nov. 14, 2019), date retrieved from google.
Cao, W., "PolarFS: An Ultra-low Latency and Failure Resilient Distributed File System for Shared Storage Cloud Database", Proceedings of the VLDB Endowment, vol. 11, No. 12, (Aug. 2018).
Alibaba Cloud, "AliSQL X-Cluster: An MySQL Database with Superior Performance and Strong Consistency", (Dec. 8, 2019).
Cano, I. et al., "Curator: Self-Managing Storage for Enterprise Clusters", 14th USENIX Symposium on Networked Systems Design and Implementation, NSDI '17, (Mar. 27, 2017).
Poitras, Steven. "The Nutanix Bible" (Jul. 9, 2019), from https://nutanixbible.com/ (Publication date based on indicated capture date by Archive.org; first publication date unknown).
Poitras, Steven. "The Nutanix Bible" (Feb. 3, 2020), from https://nutanixbible.com/ (Publication date based on indicated capture date by Archive.org; first publication date unknown).
Final Office Action dated Aug. 5, 2020 for U.S. Appl. No. 16/041,348.
Notice of Allowance dated Nov. 4, 2020 for related U.S. Appl. No. 15/160,347.
Mizrak, A. T et al., "VMWARE vCenter Server High Availability Performance and Best Practices", VMware vCenter Server 6.5, Performance Study, VMware, (Nov. 2016).
VMware, "vSAN Planning and Deployment", VMware vSphere 7.0, VMware vSAN 7.0, VMware, Inc., (Apr. 2, 2020).
VMware, "VMware Infrastructure, Automating High Availability (HA) Services with VMware HA", VMware Technical Note, (Revised on Jun. 5, 2006).
VMware, "VMware® High Availability (VMware HA): Deployment Best Practices", VMware® vSphere™ 4.1, Technical White Paper, (Dec. 10, 2010), date retrieved from google.
Potheri, M. et al., "VMware vCenter Server™ 6.0, Availability Guide", Technical Marketing Documentation, Version 1.0, (May 2015).
McCarty, J., "VMware® Virtual SAN™ Stretched Cluster: Bandwidth Sizing Guidance", Technical White Paper, VMware, (Jan. 26, 2016), date retrieved from google.
McCarty, J., "VMware® Virtual SAN™ 6.1 Stretched Cluster & 2 Node Guide", Storage and Availability Business Unit, VMware, v 6.1.0c, version 0.20, (Jan. 2016).
Dell: "High Availability and Data Protection With Dell EMC Isilon Scale-Out NAS", (Jul. 2018), Dell Inc.
Jcosta et al., "High Availability Setup Using Veritas Cluster Server and NetApp Synchronous SnapMirror—One button Failover-Failback with SnapMirror Sync and Veritas Cluster Server", (Nov. 18, 2010), NetApp Community.
NetApp: "Preparing storage systems for SnapMirror replication", (Jul. 2015), NetApp, Inc.
Bounds, J., "High-Availability (HA) Pair Controller Configuration Overview and Best Practices", (Feb. 2016), NetApp, Inc.
Netapp, "Clustered Data ONTAP 8.2 File Access Management Guide for CIFS", NetApp, Inc., (Feb. 2014).
Jung, Y . et al. " Standard-based Virtual Infrastructure Resource Management for Distributed and Heterogeneous Servers", ICACT, (Feb. 15, 2009).
Dell EMC, "Dell EMC Isilon OneFS Operating System, Scale-out NAS to maximize the data capital and business value of your unstructured data", Data Sheet, (Jan. 31, 2019), date retrieved from google.
Dell EMC, "Dell EMC Isilon OneFS Operating System, Powering the Isilon Scale-Out Storage Platform", White Paper, (Dec. 2019).
EMC, "EMC Isilon OneFS Operating System, Powering scale-out storage for the new world of Big Data in the enterprise", Data Sheet, (Apr. 2013).
EMC, Isilon OneFS, Version 8.0.1, Web Administration Guide, EMC Corporation, (Oct. 2016).
NetApp, "Enabling or disabling SMB automatic node referrals", ONTAP 9 Documentation Center, NetApp, Inc., (Updated Dec. 2020), from https://docs.netapp.com/ontap-9/index.jsp?topic=%2Fcom.netapp.doc.cdot-famg-cifs%2FGUID-AC7E8515-3A4C-4BB5-A8C8-38B565C952EO.html,.
NetApp, "Guaranteeing throughput with QoS", ONTAP 9 Documentation Center, NetApp, Inc., (Updated Dec. 2020), from https://docs.netapp.com/ontap-9/index.jsp?topic=%2Fcom.Netapp.doc.pow-perf-mon%2FGUID-77DF9BAF-4ED7-43F6-AECE-95DFB0680D2F.html.
NetApp. "How to troubleshoot the 'Autolocation' feature in Clustered Data ONTAP", Knowledgebase, NetApp, (Jun. 4, 2019).
NetApp. "How to troubleshoot the 'Autolocation' feature in Clustered Data ONTAP—Results", Knowledgebase, NetApp, (Captured on Sep. 19, 2019).
Cloudian, "Hybrid Cloud Storage with Cloudian HyperStore and Amazon S3", Solution Brief, Cloudian Inc., (Aug. 2015).
NetApp, "Improving client response time by providing SMB automatic node referrals with Auto Location", NetApp, Inc., (May 2013), from https://library.netapp.com/ecmdocs/ECMP1196891/html/GUID-0A5772A4-A6D7-4A00-AC2A-92B868C5B3B5.html.
NetApp, "Managing Workloads", ONTAP 9 Documentation Center, NetApp, Inc., (Updated Dec. 2020), from https://docs.netapp.com/ontap9/index.jsp?topic=%2Fcom.netapp.doc.pow-perf-mon%2FGUID-13D35FC5-AF37-4BBD-8A8E-B1OB41451A16.html.
Nutanix, "Nutanix AFS—Introduction & Steps For Setting Up", (Jan. 3, 2018), from https://virtual building blocks. com/2018/01/03/nutanix-afs-introduction-steps-for-setting-up/.
NetApp, "Protect Your Data with NetApp Element Software", Solution Brief, NetApp, (Oct. 11, 2020), date retrieved from google.
Kemp, E., "NetApp SolidFire SnapMirror Architecture and Configuration", Technical Report, NetApp, (Dec. 2017).
Kleyman, B., "How Cloud Computing Changes Storage Tiering", DataCenter Knowledge, (Nov. 12, 2015).

(56) References Cited

OTHER PUBLICATIONS

Poitras, Steven. "The Nutanix Bible" (Aug. 1, 2020), from https://nutanixbible.com/ (Publication date based on indicated capture date by Archive.org; first publication date unknown).
Virtuadmin, "Configure vCenter High Availability", Virtubytes, (Sep. 14, 2017).
U.S. Appl. No. 17/129,425 titled " Parallel Change File Tracking in a Distributed File Server Virtual Machine (FSVM) Architecture" filed Dec. 21, 2020.
U.S. Appl. No. 16/942,929 titled "Method Using Access Information in a Distributed File Server Virtual Machine (FSVM) Architecture, Including Web Access"; filed Jul. 30, 2020.
U.S. Appl. No. 16/944,323 titled "Actions Based On File Tagging in a Distributed File Server Virtual Machine (FSVM) Environment", filed Jul. 31, 2020.
U.S. Appl. No. 17/091,758 titled "Virtualized File Server Distribution Across Clusters", filed Nov. 6, 2020.
Non-Final Office Action dated Sep. 30, 2020 for related U.S. Appl. No. 16/177,126.
Notice of Allowance dated Mar. 3, 2021 for U.S. Appl. No. 16/041,348.
Notice of Allowance dated Mar. 10, 2021 for related U.S. Appl. No. 15/160,347.
Rivera, R., "VMware Virtual SAN: Witness Component Deployment Logic", VMware vSphere Bloi, (Apr. 1, 2014).
Page, M. "EMC Vplex Witness Deployment Within VMware Vcloud Air", White Paper, EMC, (Oct. 7, 2016).
EMC, "EMC Vplex Witness Deployment Within VMware Vcloud Air", White Paper, EMC, (Jul. 2013).
"New VMware HCL category: vSphere Metro Stretched Cluster", Virtual Geek, (Oct. 5, 2011).
Lakkapragada, S. et al., "Site Recovery Manager and Stretched Storage: Tech Preview of a New Approach to Active-Active Data Centers", VMware, (Nov. 2014).
Epping, D., "Stretched vCloud Director Infrastructure", VMware, (Jan. 23, 2013).
Bernasconi, A. et al., "IBM SAN and SVC Stretched Cluster and VMware Solution Implementation", IBM Redbooks, (Apr. 2013).
Ashish, S. et al., "IBM SAN vol. Controller Stretched Cluster with PowerVM and PowerHA", IBM Redbooks, (Jul. 2013).
Dell, "Multi-AZ (stretched cluster)", Architecture Guide—VMware Cloud Foundation 3.10.01 on VxRail, Dell Technologies, (Oct. 2001).
Daveberm, "Step-By-Step: Configuring a 2-NODE Multi-Site Cluster On Windows Server 2008 R2—Part 1", Clustering for Mere Mortals, (Sep. 15, 2009).
"Failover Clustering (III)", Networks & Servers Blog, (Sep. 2011).
Sarmiento, E., "Force Start a Windows Server Failover Cluster without a Quorum to bring a SQL Server Failover Clustered Instance Online", (Aug. 22, 2014).
Horenbeeck, M. V., "Spooky! the Curious Case of the 'Ghost' File Share Witness . . . ", (Jul. 15, 2014).
VMware, "Administering VMware Virtual SAN: VMware vSphere 6.5, vSAN 6.6", VMware, (Jun. 26, 2017).
Littman, M. L., "The Witness Algorithm: Solving Partially Observable Markov Decision Process", Brown University, (Dec. 1994).
Oracle, "Deploying Microsoft SQL Server Always On Availability Groups", Oracle White Paper, (Sep. 2018).
Enterprisedb, "EDB Failover Manager Guide: Failover Manager Version 2.0.3", EnterpriseDB Corporation, (Dec. 18, 2015).
"Explaining the Stormagic SvSAN WITNESS", White Paper, (Aug. 29, 2018).
"2016 Failover cluster using Azure blob as a cluster quorum", Teckadmin, (Mar. 31, 2019).
Deschner, G. et al., "Calling the Witness: SMB3 Failover with Samba/CTDB", Redhat, (Oct. 2, 2015).
Microsoft, "High Availability Solutions: SQL Server 2012 Books Online", Microsoft (Jun. 2012).
Mitchell, D., "Introduction to VMware vSAN™ for VMware Cloud Providers™," Version 2.9, VMware, (Jan. 2018).
Mitchell, D., "Introduction to VMware vSAN™ for VMware vCloud Air™ Network", Version 2.7, VMware, (Feb. 2017).
Paderin, M. "Analysis of Server Clustering Its Uses and Implementation", Bachelor's thesis Information Technology, (Dec. 2017).
VMware, "Virtualizing Microsoft Applications on VMware Virtual SAN", Reference Architecture, VMware, (Apr. 2, 2015).
Deschner, G., "Implementing the Witness protocol in Samba", Redhat, (Jun. 22, 2015).
Deschner, G., "Cluster improvements in Samba4", Redhat, (May 30, 2016).
Ngyuen, L., "SMB 3 Transparent Failover for Hitachi NAS Platform 4000 Series", Tech Note, Hitachi Data Systems, (Nov. 2016).
McCarty, J. "VMware Horizon 6 with App volumes and Virtual SAN Reference Architecture", Storage and Availability Business Unit, VMware (Jan. 2016).
VMware, "VMware Horizon 6 with App volumes and Virtual SAN Reference Architecture", Technical White Paper, VMware, (Apr. 9, 2011), date retrieved from google.
Feroce, D., "Leveraging VMware vSAN™ for Highly Available Management Clusters", Version 2.9, VMware, (Jan. 2018).
VMware, "Deployment for Multiple Availability Zones", VMware Validated Design for Software-Defined Data Center 4.3, VMware, (Jul. 17, 2018).
Hogan, C., "VMware Virtual SAN Health Check Guide", Storage and Availability Business Unit, v 6.1.0, VMware, (Sep. 2015).
Banerjee, A. et al., "VMware Virtual SAN™ Stretched Cluster: Performance and Best Practices", Technical White Paper, VMware, (Oct. 22, 2015).
Hosken, M., "VMware vSAN™ Two-Node Architecture VMware Cloud Provider™ Use Cases", Version 2.9, VMware, (Jan. 2018).
"VMware Virtual SAN 6.2", Licensing Guide, VMware, (Revised Jun. 2016).
Hunter, J., "VMware Virtual SAN 6.2", PCI DSS Compliance Guide, (Revised Feb. 2016).
"VMware Virtual SAN: SAP Applications", Solution Overview, VMware, (May 6, 2016).
Eckerle, A. et al., "What's New in VMware vSphere® 6.5", Technical White Paper, (Nov. 15, 2016).
Notice of Allowance dated Jun. 24, 2021 for U.S. Appl. No. 16/041,348.
Notice of Allowance dated Aug. 4, 2021 for related U.S. Appl. No. 15/160,347.
Non-Final Office Action dated Feb. 4, 2020 for U.S. Appl. No. 16/041,348.
Final Office Action dated Apr. 26, 2021 for related U.S. Appl. No. 16/177,126.
Non-Final Office Action dated Sep. 7, 2021 for U.S. Appl. No. 16/947,444.

\* cited by examiner

MECHANISM FOR PROVIDING EXTERNAL ACCESS TO A SECURED NETWORKED VIRTUALIZATION ENVIRONMENT

CROSS REFERENCE TO RELATED APPLICATIONS

The present application is a continuation of U.S. patent application Ser. No. 14/708,091, filed on May 8, 2015, titled "MECHANISM FOR PROVIDING EXTERNAL ACCESS TO A SECURED NETWORKED VIRTUALIZATION ENVIRONMENT", and claims the benefit of U.S. Provisional Application Ser. No. 61/991,195, filed on May 9, 2014, titled "MECHANISM FOR PROVIDING EXTERNAL ACCESS TO A SECURED NETWORKED VIRTUALIZATION ENVIRONMENT", the content of the aforementioned applications are hereby incorporated by reference in its entirety.

The present application is related to U.S. Pat. No. 8,601,473, entitled "ARCHITECTURE FOR MANAGING I/O AND STORAGE FOR A VIRTUALIZATION ENVIRONMENT", issued on Dec. 3, 2013, and which is hereby incorporated by reference in its entirety.

FIELD

This disclosure concerns a mechanism for providing external access to a secured networked virtualization environment.

BACKGROUND

A networked virtualization environment includes several nodes (e.g., servers, data centers, etc.) that are in communication with each other, each node hosting several user virtual machines. The networked virtualization environment, otherwise referred to as a cluster of nodes, is normally deployed for use within a secured environment, such that only internal accesses to the nodes within the cluster are allowed. In order to maintain security within the cluster of nodes, a firewall is typically provided to prevent external access into the cluster of nodes. Even where a firewall is not provided, the nodes within the cluster are provided private IP addresses such that the nodes cannot be externally accessed.

During operation of the cluster of nodes, a need may arise for an external entity to gain access into the cluster of nodes. This may occur where an external entity is needed to service or provide support to the cluster of nodes. Because the cluster of nodes are protected by a firewall or otherwise inaccessible to external entities, a mechanism is needed for providing external access to the secured networked virtualization environment (e.g., cluster of nodes).

SUMMARY OF THE INVENTION

Embodiments of the present invention provide a mechanism for providing external access to a secured networked virtualization environment. The method for providing external access to a secured networked virtualization environment includes performing a leadership election amongst nodes of the secured networked virtualization environment to elect a leader node, assigning a cluster virtual IP address to the leader node and generating a reverse tunnel, using a processor, by the leader node to allow for an external entity to communicate with the secured networked virtualization environment.

Further details of aspects, objects and advantages of the invention are described below in the detailed description, drawings and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect of or advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments", in various places throughout this specification are not necessarily referring to the same embodiment or embodiments.

Figure 1:
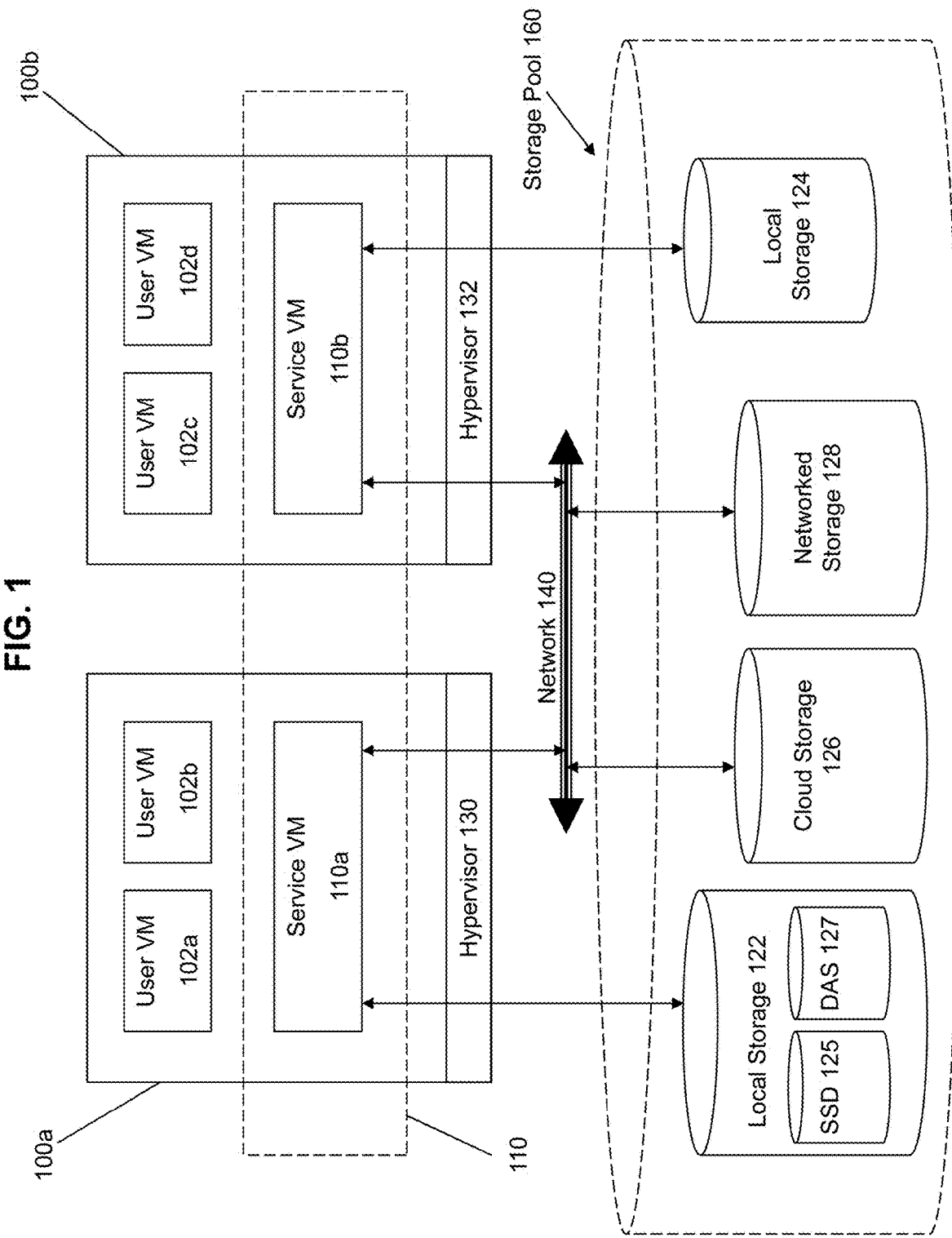
FIG. 1 illustrates a networked virtualization environment for storage management according to some embodiments.

FIG. 1 illustrates a networked virtualization environment for storage management according to some embodiments of the invention. The networked virtualization environment of FIG. 1 can be implemented for a distributed platform that contains multiple nodes (e.g., servers) 100a and 100b that manages multiple-tiers of storage. The multiple tiers of storage include storage that is accessible through a network 140, such as cloud storage 126 or networked storage 128 (e.g., a SAN or "storage area network"). Unlike the prior art, the present embodiment also permits local storage 122/124 that is within or directly attached to the node and/or appliance to be managed as part of the storage pool 160. Examples of such storage include Solid State Drives (henceforth "SSDs") 125 or Hard Disk Drives (henceforth "HDDs" or "spindle drives") 127. These collected storage devices, both local and networked, form a storage pool 160. Virtual disks (or "vDisks") can be structure from the storage devices in the storage pool 160. As used herein, the term vDisk refers to the storage abstraction that is exposed by a Service/Controller VM to be used by a user VM. In some embodiments, the vDisk is exposed via iSCSI ("internet small computer system interface") or NFS ("network file system") and is mounted as a virtual disk on the user VM.

Each node 100a or 100b runs virtualization software, such as VMWare ESX(i), Microsoft Hyper-V, or RedHat KVM. The virtualization software includes a hypervisor 130/132 to manage the interactions between the underlying hardware and the one or more user VMs 102a, 102b, 102c and 102d that run client software.

A special VM 110a/110b is used to manage storage and I/O activities according to some embodiments of the invention, which is referred to herein as a "Service VM". The term Service VM may also be referred to herein as a Controller VM. This is the "Storage Controller" in the currently described networked virtualization environment for storage management. Multiple such storage controllers coordinate within a cluster to form a single-system. The Controller VMs 110a/110b are not formed as part of specific implementations of hypervisors 130/132. Instead, the Controller VMs run as virtual machines above hypervisors 130/132 on the various servers 102a and 102b, and work together to form a distributed system 110 that manages all the storage resources, including the locally attached storage 122/124, the networked storage 128, and the cloud storage 126. Since the Controller VMs run above the hypervisors 130/132, this means that the current approach can be used and implemented within any virtual machine architecture, since the Controller VMs of embodiments of the invention can be used in conjunction with any hypervisor from any virtualization vendor.

Each Controller VM 110a-b exports one or more block devices or NFS server targets that appear as disks to the client VMs 102a-d. These disks are virtual, since they are implemented by the software running inside the Controller VMs 110a-b. Thus, to the user VMs 102a-d, the Controller VMs 110a-b appear to be exporting a clustered storage appliance that contains some disks. All user data (including the operating system) in the client VMs 102a-d resides on these virtual disks.

Significant performance advantages can be gained by allowing the virtualization environment to access and utilize local (e.g., server-internal) storage 122. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Once the virtualization environment is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 122. On the other hand, data that does not require fast access or which is accessed infrequently can be stored in the networked storage devices 128 or in cloud storage 126.

Another advantage provided by this approach is that administration activities can be handled on a much more efficient granular level. Recall that the prior art approaches of using a legacy storage appliance in conjunction with VMFS heavily relies on what the hypervisor can do at its own layer with individual "virtual hard disk" files, effectively making all storage array capabilities meaningless. This is because the storage array manages much coarser grained volumes while the hypervisor needs to manage finer-grained virtual disks. In contrast, the present embodiment can be used to implement administrative tasks at much smaller levels of granularity, one in which the smallest unit of administration at the hypervisor matches exactly with that of the storage tier itself.

Yet another advantage of the present embodiment of the invention is that storage-related optimizations for access and storage of data can be implemented directly within the primary storage path. For example, in some embodiments of the invention, the Controller VM 110a can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Controller VMs include quality of service (QOS) functions, encryption and compression. The networked virtualization environment massively parallelizes storage, by placing a storage controller—in the form of a Controller VM—at each hypervisor, and thus makes it possible to render enough CPU and memory resources to achieve the aforementioned optimizations.

Additional details regarding networked virtualization environments for storage management are described in related U.S. Pat. No. 8,601,473, issued on Dec. 3, 2013, entitled "Architecture for Managing I/O and Storage for a Virtualization Environment", which is hereby incorporated by reference in its entirety.

A networked virtualization environment includes several nodes (e.g., servers, data centers, etc.) that are in communication with each other, each node hosting several user virtual machines. An example of such a networked virtualization environment is illustrated in FIG. 1. The networked virtualization environment, otherwise referred to as a cluster of nodes, is normally deployed for use within a secured environment, such that only internal accesses to the nodes within the cluster are allowed. In order to maintain security within the cluster of nodes, a firewall is typically provided to prevent external access into the cluster of nodes. Even where a firewall is not provided, the nodes within the cluster are provided private IP addresses such that the nodes cannot be externally accessed.

Figure 2:
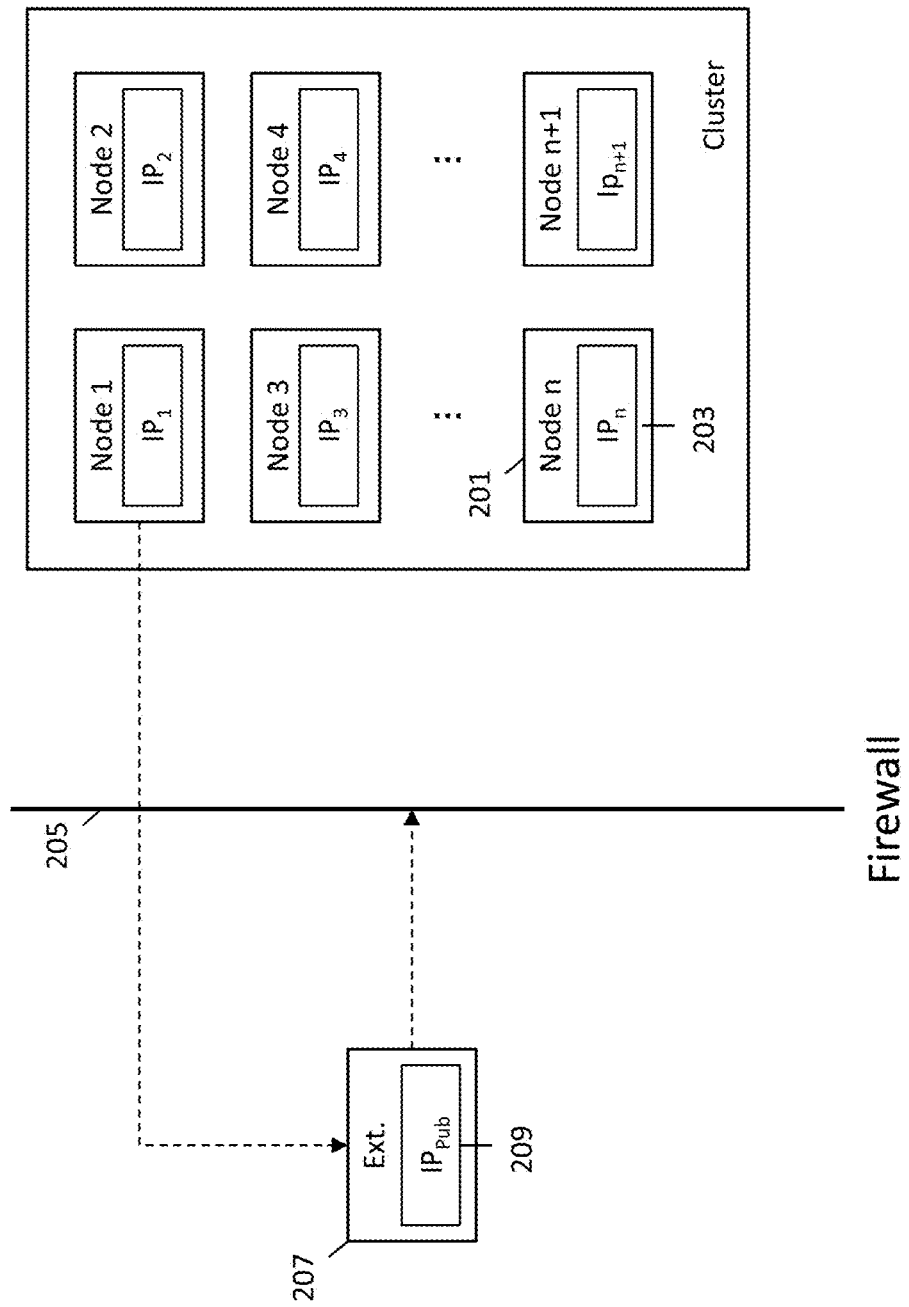
FIG. 2 is schematic diagram illustrating the prevention of external access to a secured networked virtualization environment.

FIG. 2 is schematic diagram illustrating the prevention of external access to a secured networked virtualization environment. FIG. 2 illustrates an external entity 207 with a public IP address 209 and a cluster of nodes (i.e., networked virtualization environment), where each node is associated with a private IP address 203. A firewall 205 is provided between the external entity and the cluster of nodes 201 to prevent access to the cluster of nodes by the external entity.

By providing each node 201 within the cluster with a private IP address 203, internal communications between nodes 201 located in the cluster is allowed while external access to nodes 201 within the cluster is prevented because the external entity 207 is unable to access the private IP address 203 of the nodes 201 within the cluster. While the external entity 207 is prevented from accessing the nodes within the cluster, the nodes 201 within the cluster are allowed to communicate with the external entity 207 by way of the external entity's public IP address 209.

An additional layer of protection is also provided by the firewall 205. The firewall allows for nodes 201 within the cluster to communicate with the external entity 207, but prevents the external entity 207 from being able to access nodes 201 within the cluster, as illustrated by the unidirectional dashed arrows in FIG. 2.

During operation of the cluster of nodes, a need may arise for the external entity 207 to gain access into nodes 201 within the cluster. This may occur where the external entity 207 is needed to service or provide support to nodes 201 within the cluster. Because the nodes 201 within the cluster are protected by a firewall or otherwise inaccessible to external entities (e.g., due to their private IP addresses), a mechanism is needed for providing external access to the secured networked virtualization environment (e.g., cluster of nodes).

Figure 3:
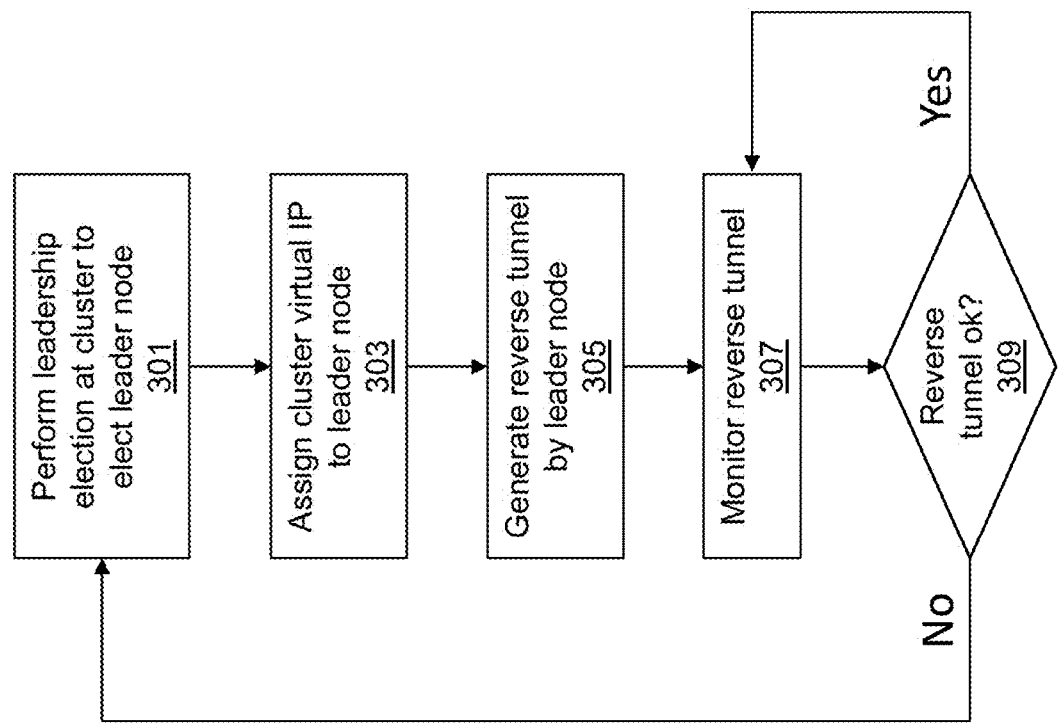
FIG. 3 is a flow diagram illustrating a method for providing external access to a secured networked virtualization environment according to some embodiments.

FIG. 3 is a flow diagram illustrating a method for providing external access to a secured networked virtualization environment according to some embodiments. The method of FIG. 3 provides for a single point of external access into the secured networked virtualization environment (e.g., cluster of nodes). This allows for nodes within the cluster to be accessed by an external entity through the single access point rather than requiring each individual node within the cluster to independently provide for external access.

Initially a leadership election is performed by the secured networked virtualization environment (e.g., cluster of nodes) to elect a leader node as shown at 301. The leader node will be responsible for providing external access to the cluster of nodes, and will also be utilized to direct the external communications from external entities to the appropriate nodes within the cluster. By electing a leader node, a single point of external access is provided for the cluster, rather than having each node within the cluster independently provide for external access. This allows for external entities looking to service or provide support to the cluster of nodes to communicate through a single end-point rather than having to separately communicate through multiple different endpoints, thereby streamlining the process for providing external access.

Figure 4:
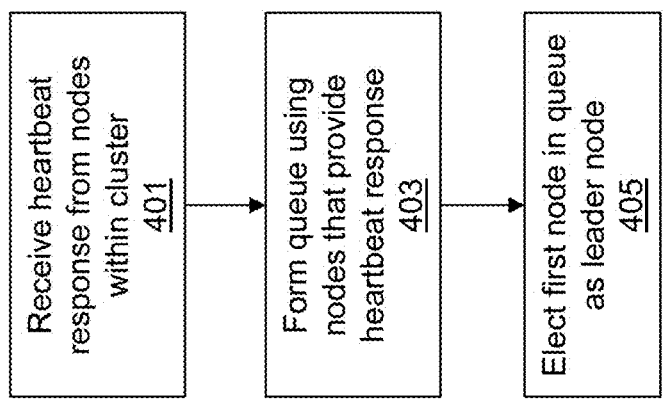
FIG. 4 is a flow diagram illustrating a method for performing leadership election at the secured networked virtualization environment to provide access to the secured networked virtualization environment according to some embodiments.

Various methods for leadership election exist for electing a leader node from the cluster of nodes. An example of a leadership election is described in FIG. 4. FIG. 4 is a flow diagram illustrating a method for performing leadership election at the secured networked virtualization environment to provide access to the secured networked virtualization environment according to some embodiments.

In the networked virtualization environment (e.g., cluster of nodes), a distributed configuration module may exist at each node. The distributed configuration module keeps track of various parameters related to the networked virtualization environment, including the health of nodes within the cluster. Each node may utilize its own instance of the distributed configuration modules, and the different distributed configuration modules may communicate amongst each other to track parameters for all nodes with the cluster.

One feature provided by the distributed configuration modules is heartbeat tracking. Each node may receive a request from its corresponding distributed configuration module requesting its health status. The node may respond with an indication of good health, or otherwise not respond, which indicates that it is in a failure state. The distributed configuration modules within the cluster may communicate amongst each other such that every node is aware of the health of every other node in the networked virtualization environment.

When leadership election is to occur for the cluster of nodes, the distributed configuration modules may receive heartbeat responses from their corresponding nodes as shown at 401. For the nodes that do provide heartbeat responses, a queue may be formed as shown at 403. This may be accomplished by placing the first node that provides a heartbeat response at the head of the queue, and placing each subsequent node that provides a heartbeat response in a respective location within the queue. The distributed configuration modules at each node may communicate amongst each other to determine the order of nodes within the queue.

The queue may be updated periodically, such as for each heartbeat request and heartbeat response. When a node currently located in the queue subsequently fails to provide a heartbeat response, it may be removed from the queue. Likewise, when a node that is not currently located in the queue subsequently provides a healthy heartbeat response, it is placed in the appropriate position in the queue.

After the queue is formed using nodes that provide a heartbeat response, the node located in the first position in the queue is elected as the leader node as shown at 405. As mentioned above, the elected leader node will be responsible for providing external access to the cluster of nodes, and will also be utilized to direct the external communications from external entities to the appropriate nodes within the cluster.

Once the leader node has been elected, a cluster virtual IP address is assigned to the leader node as shown at 303. By assigning a cluster virtual IP address to the leader node, a single IP address may be utilized for all external accesses into the cluster of nodes. Whenever the leader node fails, and a new leader node is elected, the new leader node may be assigned the same cluster virtual IP address such that external communication with the cluster through the new leader node may still be accomplished using the same cluster virtual IP address. This avoids the need to provide a different IP address each time a different leader node is elected for the cluster, thereby simplifying the process for providing external access to the cluster.

The nodes within the cluster may continue to communicate internally amongst each other using their individual private IP addresses. The cluster virtual IP address is only used to allow for external communication from an external entity into the cluster of nodes that utilizes.

After the leader node has been assigned the cluster virtual IP address, the leader node generates a reverse tunnel to allow for the external entity to communicate with the cluster as shown at 305. In order to generate a reverse tunnel, the leader node may first identify a port number at an external entity through which the external entity may communicate with the leader node. In some embodiments, the leader node may use a statically determined port (e.g., statically determined port number) at the external entity. In other embodiments, the leader node may use dynamically determined port (e.g., dynamically determined port number) at the external entity.

The external entity may be selected from a configured list of external entities assigned to and stored at the cluster of nodes. The configured list of external entities may be stored within the secured networked virtualization environment to allow for the secured networked virtualization environment to identify the external entity for providing external access. In some embodiments, the external entity is identified based on its ability to establish communication with the secured networked virtualization environment. For example, the external entity may be determined by iterating through the configured list of external entities until an external entity is encountered with which communication can be established and port numbers determined. This list of external entities may be periodically refreshed by communicating with an entity from the current list. For example, the list of external entities may be refreshed once daily. This allows for the configured list of external entities to be modified (e.g., new external entities added) without requiring a manual reset or a software package upgrade. Additionally, to enable load balancing different clusters may be assigned different lists of external entities based on their unique identifiers. Thus the reverse tunnels established across different clusters may be distributed among different external entities.

Figure 5:
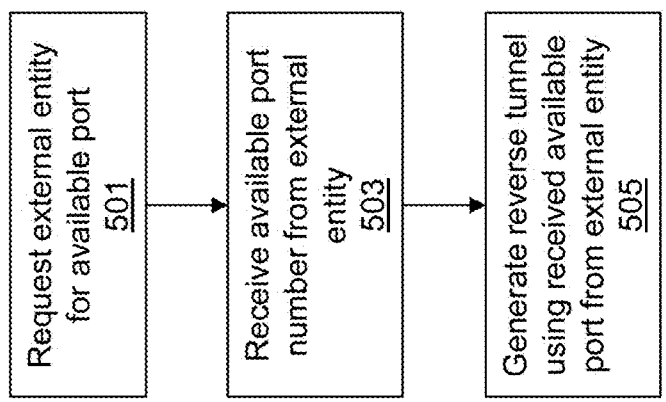
FIG. 5 is a flow diagram illustrating a method for dynamically providing external access to the secured networked virtualization environment according to some embodiments.

FIG. 5 is a flow diagram illustrating a method for dynamic port generation for providing external access to the secured networked virtualization environment according to some embodiments. Initially, the leader node requests the external entity for an available port number as shown at 501. The external entity may then examine its port availability to identify an available port to be used for accessing the cluster of nodes. Once the external entity identifies an available port to be used for accessing the cluster of nodes, it responds to the cluster's request by providing the available port number. At the same time, the external entity associates the port number with the requesting cluster. This is done so that the same port number may be assigned to the cluster where the leader node dies, a new leader node is elected, and the new leader is used to generate another reverse tunnel to the external entity to provide the external entity access to the cluster of nodes.

The leader node receives the available port number from the external entity as shown at 503 and then generates the reverse tunnel using the received available port number from the external entity as shown at 505, which will be discussed in greater detail below. By providing for dynamic port generation, the port utilized by the external entity for access into the secured cluster of nodes may be determined based on availability rather than having to statically provide a port for external access.

After identifying a port number at the external entity through which the external entity may communicate with the leader node (either statically or dynamically), the leader node may then perform a secured shell (SSH) command with the identified port number, the cluster virtual IP, and a public SSH key for the external entity. The command is performed by the leader node causing a tunnel to be created between the external entity and the leader node through which the external entity may communicate with the cluster. The external entity then communicates with the cluster via the tunnel formed between the external entity and the leader node.

The reverse tunnel is monitored at the cluster as shown at 307. While monitoring the reverse tunnel, the cluster may periodically check to see if the reverse tunnel remains operational as shown at 309. If the reverse tunnel becomes non-operational, the method returns to 301 where a new leader node is elected and another reverse tunnel is generated, which will be described in greater detail below. In some embodiments, the reverse tunnel may become non-operational when the leader node fails.

If the reverse tunnel remains operational, the method may return to 307 where the cluster continues to monitor the reverse tunnel. If the cluster of nodes decides that it no longer wants to provide access to external entities, it may terminate the reverse tunnel as shown at 311.

Figure 6A:
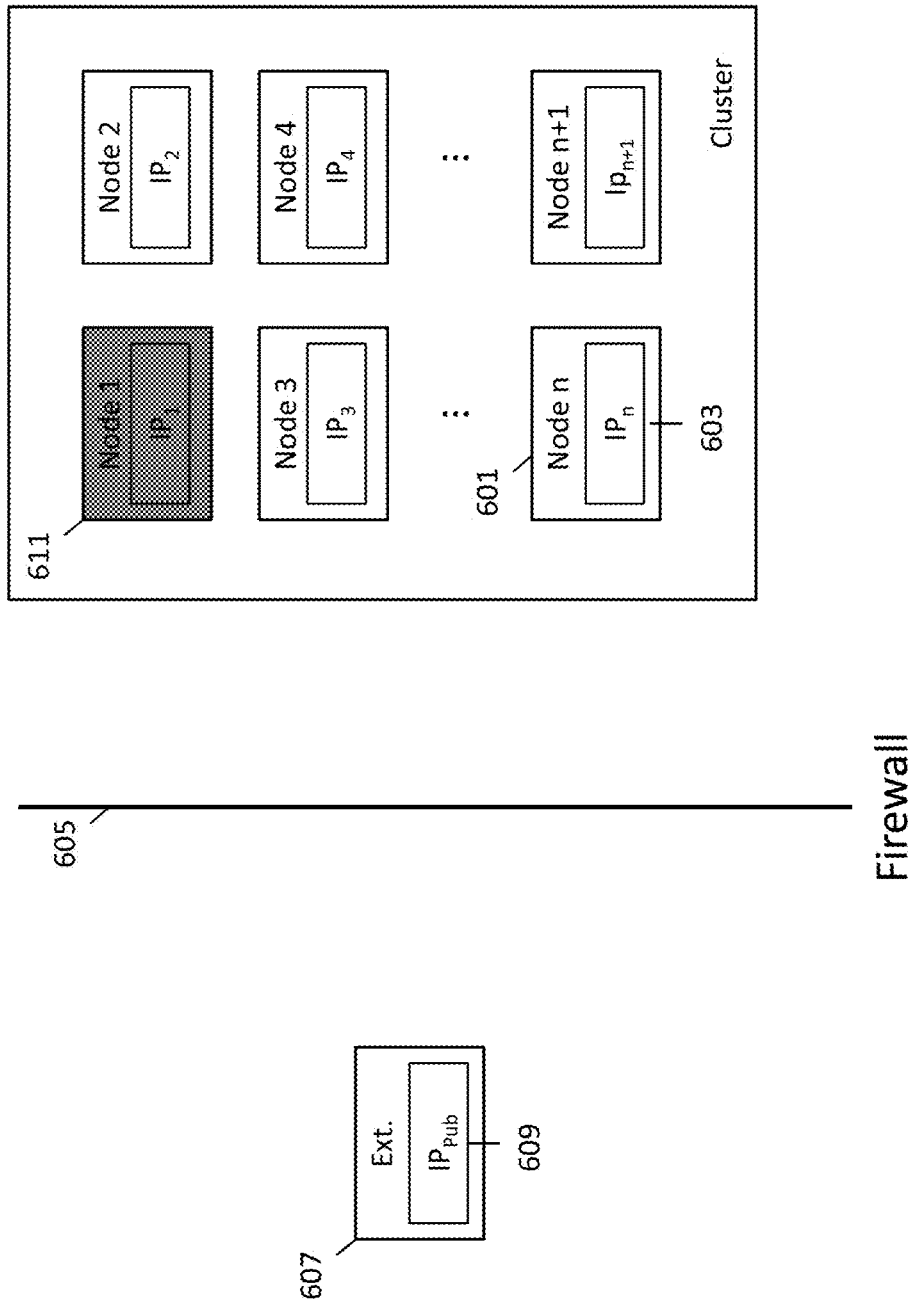
FIGS. 6A to 6C are schematic diagrams illustrating a method for providing external access to a secured networked virtualization environment according to some embodiments.
Figure 6B:
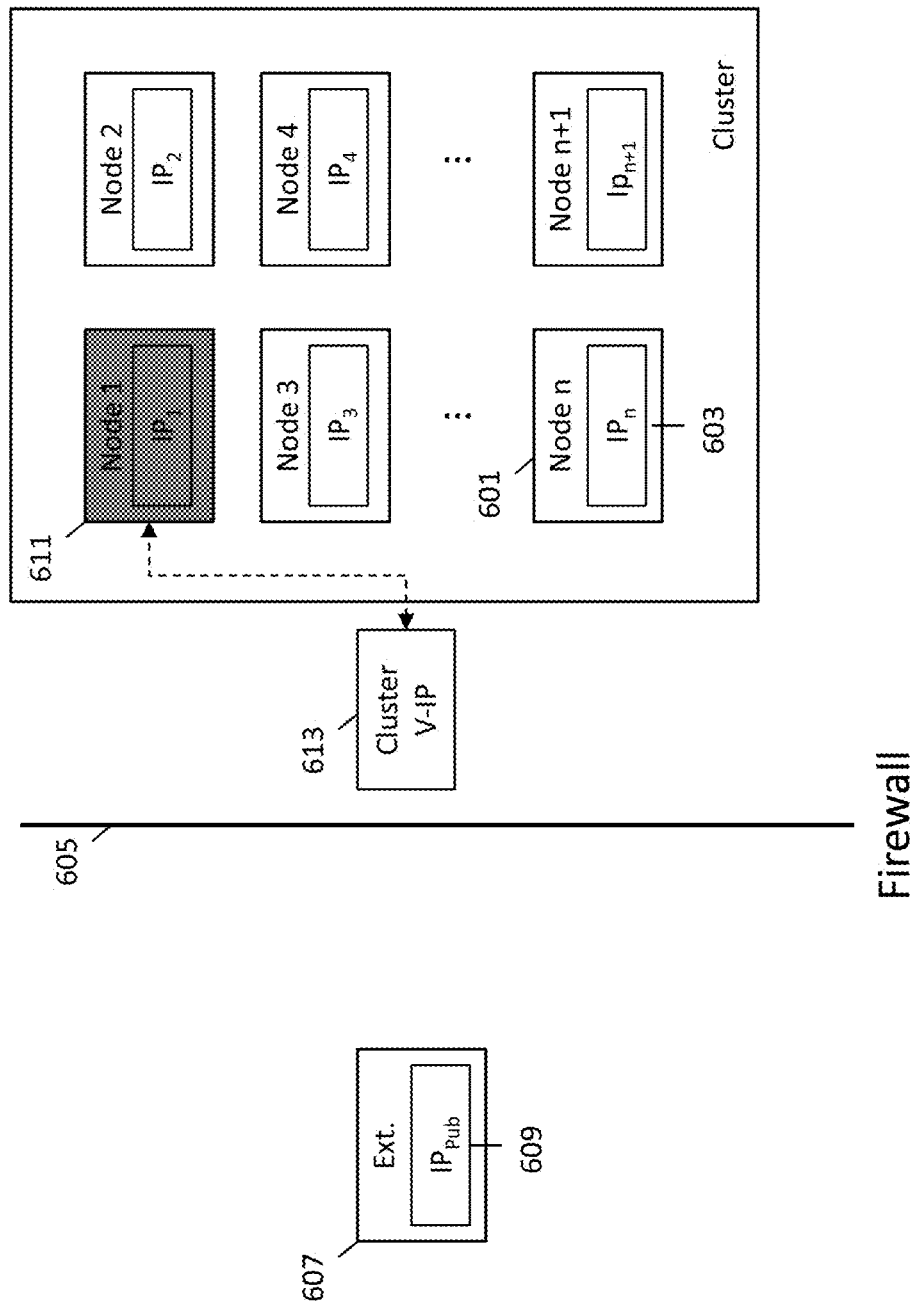
Figure 6C:
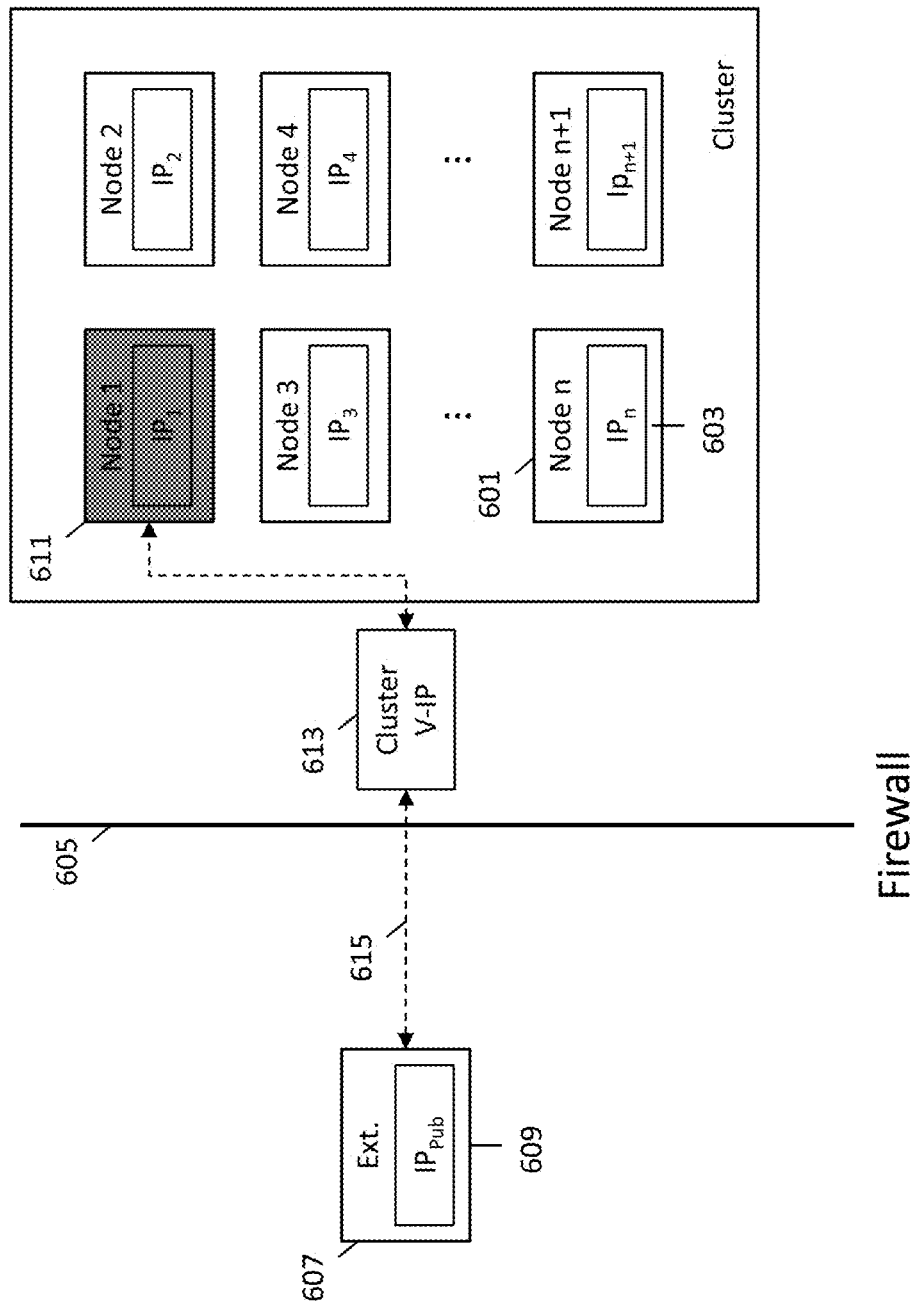

FIGS. 6A-6C are schematic diagrams illustrating a method for providing external access to a secured networked virtualization environment according to some embodiments. FIG. 6A-6C illustrate an external entity 607 with a public IP address 609 and a cluster of nodes (i.e., networked virtualization environment), where each node 601 is associated with a private IP address 603. A firewall 605 is provided between the external entity 607 and the cluster of nodes 601 to prevent access to the cluster of nodes 601 by the external entity 607.

As mentioned above, the external entity 607 may be selected from a configured list of external entities assigned to and stored at the cluster of nodes 611. The external entity that is provided with access to the cluster of nodes 601 may be determined by iterating through the configured list of external entities until the external entity 607 is encountered with which communication can be established and port numbers determined.

A leadership election is then performed by the secured networked virtualization environment (e.g., cluster of nodes) to elect a leader node 611 as illustrated in FIG. 6A. In FIG. 6A, node 1 of the cluster is elected as the leader node 611. The leadership election may be performed at the cluster in accordance with the method described in FIG. 4. However, it is important to note that various other leadership election schemes may be used to determine the leader node for the cluster.

The leader node 611 is responsible for providing external access to the cluster of nodes 601, and will also be utilized to direct the external communications from the external entity 607 to the appropriate nodes 601 within the cluster. By electing a leader node 611, a single point of external access is provided for the cluster, rather than having each node 601 within the cluster independently provide for external access. This allows for the external entity 607 looking to service or provide support to the cluster of nodes 601 to communicate through a single end-point rather than having to separately communicate through multiple different endpoints, thereby streamlining the process for providing external access.

Once the leader node 611 has been elected, a cluster virtual IP address 613 is assigned to the leader node 611 as illustrated in FIG. 6B. By assigning a cluster virtual IP address 613 to the leader node 611, a single IP address may be utilized for all external accesses into the cluster of nodes 601. Whenever the leader node 611 fails, and a new leader node is elected, the new leader node may be assigned the same cluster virtual IP address 613 such that external communication with the cluster through the new leader node may still be accomplished using the same cluster virtual IP address 613. This avoids the need to provide a different IP address each time a different leader node is elected for the cluster, thereby simplifying the process for providing external access to the cluster.

The nodes 601 within the cluster may continue to communicate internally amongst each other using their individual private IP addresses 603. The cluster virtual IP address 613 is only used to allow for external communication from the external entity 607 into the cluster of nodes 601.

After the leader node 611 has been assigned the cluster virtual IP address 613, the leader node 611 generates a reverse tunnel 615 to allow for the external entity 607 to communicate with the cluster as illustrated in FIG. 6C by the dashed arrows between the external entity 607 and the cluster virtual IP address 613. The reverse tunnel 615 may be generated by the leader node 611 in accordance with the methods described above in FIGS. 3 and 5.

Monitoring of the reverse tunnel 615 may then occur until the leader node 611 fails or the cluster otherwise decides to terminate the reverse tunnel 615 and discontinue external access. When the leader node 611 fails, external access from the external entity 607 into the cluster of nodes 601 is not lost. The cluster of nodes 601 may perform another leadership election to again generate a reverse tunnel for allowing the external entity to access the cluster of nodes.

Figure 7:
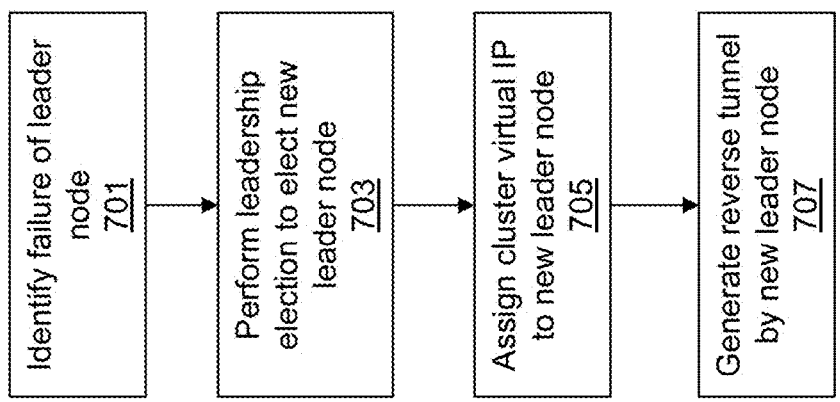
FIG. 7 is a flow diagram illustrating a method for providing external access to the secured networked virtualization environment upon failure of the leader node in the secured networked virtualization environment according to some embodiments.

FIG. 7 is a flow diagram illustrating a method for providing external access to the secured networked virtualization environment upon failure of the leader node in the secured networked virtualization environment according to some embodiments.

Initially, failure of the leader node is identified as shown at 701. As mentioned above, an instance of a distributed configuration module at each node keeps track of the health of nodes within the cluster. When the leader node fails to provide a heartbeat in response to a heartbeat request from its corresponding distributed configuration module, notification that the leader node has failed is propagated to the rest of the nodes in the cluster.

After identifying that the leader node has failed, leadership election is again performed to elect a new leader node as shown at 703. Election of the new leader node may occur in the same manner as election of failed leader node and as described above in FIG. 4. Alternatively, other leadership election schemes may be used to elect the new leader node. When leadership election is performed in the same manner as described above in FIG. 4, the next node in the queue may be elected as the new leader node. The elected new leader node will replace the failed leader node and take on the responsibility of providing external access to the cluster of nodes and directing external communications from external entities to the appropriate nodes within the cluster.

Once the new leader node has been elected, the cluster virtual IP address that was previously assigned to the failed leader node is assigned to the new leader node as shown at 705. By assigning the previously assigned cluster virtual IP address to the new leader node, external communication with the cluster through the new leader node may still be accomplished using the same cluster virtual IP address. This avoids the need to provide a different IP address each time a different leader node is elected for the cluster, thereby simplifying the process for providing external access to the cluster.

The nodes within the cluster may continue to communicate internally amongst each other using their individual private IP addresses. The cluster virtual IP address is only used to allow for external communication from an external entity into the cluster of nodes that utilizes.

After the new leader node has been assigned the cluster virtual IP address, the new leader node generates a reverse tunnel to allow for the external entity to communicate with the cluster as shown at 707. Because the previously elected leader node has failed, the reverse tunnel generated by the previously elected leader node is no longer operational. Thus, the newly elected leader node must generate another reverse tunnel to allow for external entities to communicate with the cluster. The newly elected leader node may generate the reverse tunnel in the same manner as described above for the previously elected leader node.

Because the newly elected leader node utilizes the same cluster virtual IP address as the previously elected leader node, the reverse tunnel generated by the newly elected leader node will utilize the same cluster virtual IP address as the reverse tunnel generated by the previously elected leader node. Similarly, because the newly elected leader node belongs to the same cluster as the previously elected leader node, the port number at the external entity through which the external entity may communicate with the newly elected leader node may remain the same as the port number used in conjunction with the previously elected leader node.

After the newly elected leader node has generated the reverse tunnel for allowing the external entity to communicate with the cluster, monitoring may continue to occur in the manner described above.

FIGS. 8A-8D are schematic diagrams illustrating a method for providing external access to the secured networked virtualization environment upon failure of the leader node in the secured networked virtualization environment according to some embodiments. FIGS. 8A-8D illustrate the failure of the leader node from the arrangement depicted in FIGS. 6A-6C.

Figure 8A:
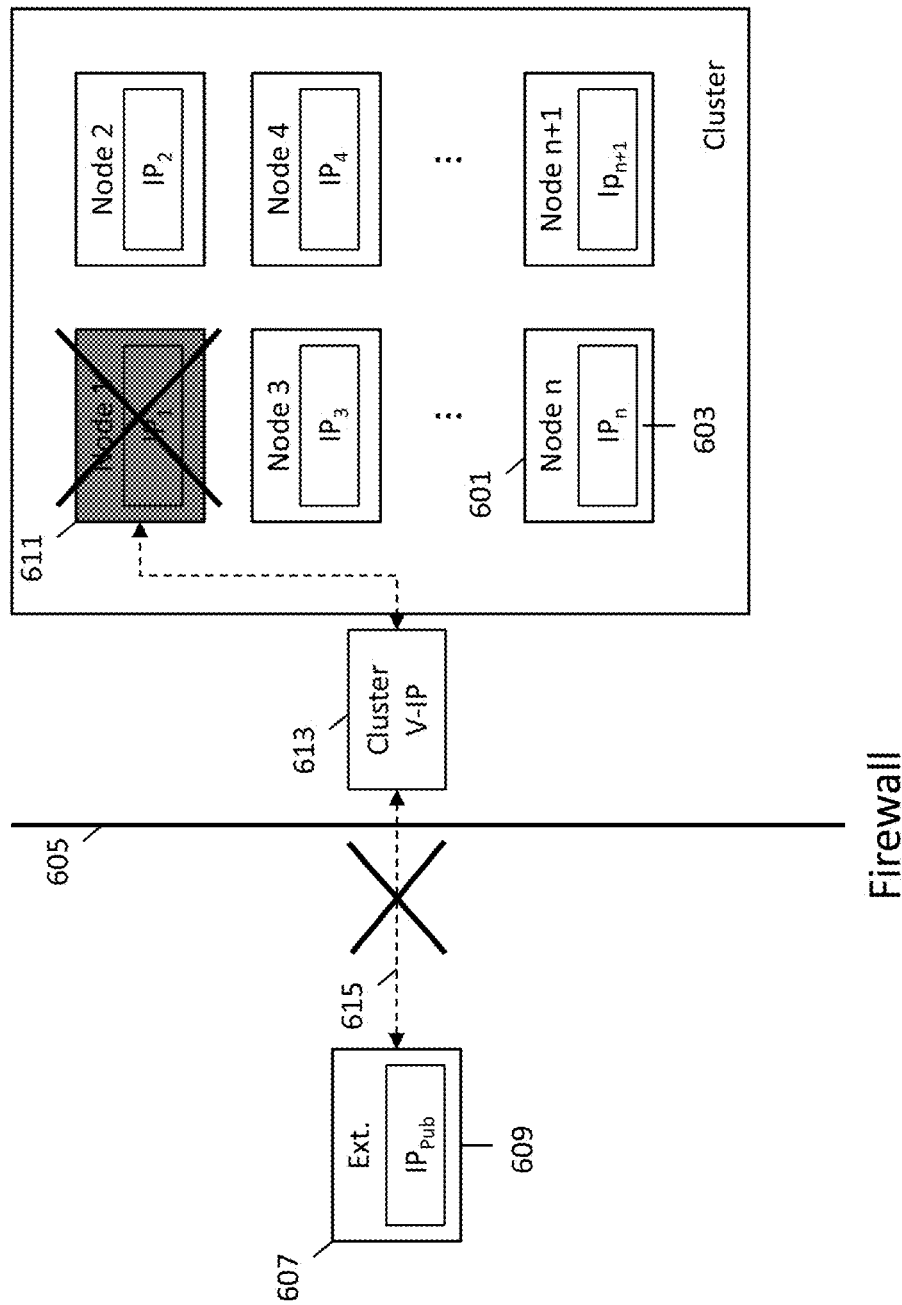
FIGS. 8A-8D are schematic diagrams illustrating a method for providing external access to the secured networked virtualization environment upon failure of the leader node in the secured networked virtualization environment according to some embodiments.

In FIG. 8A, the leader node 611 fails and the reverse tunnel generated (e.g., cluster virtual IP address 613) by the leader node is no longer operational. The failure of the leader node 611 is identified in the manner described above in FIG. 7.

Figure 8B:
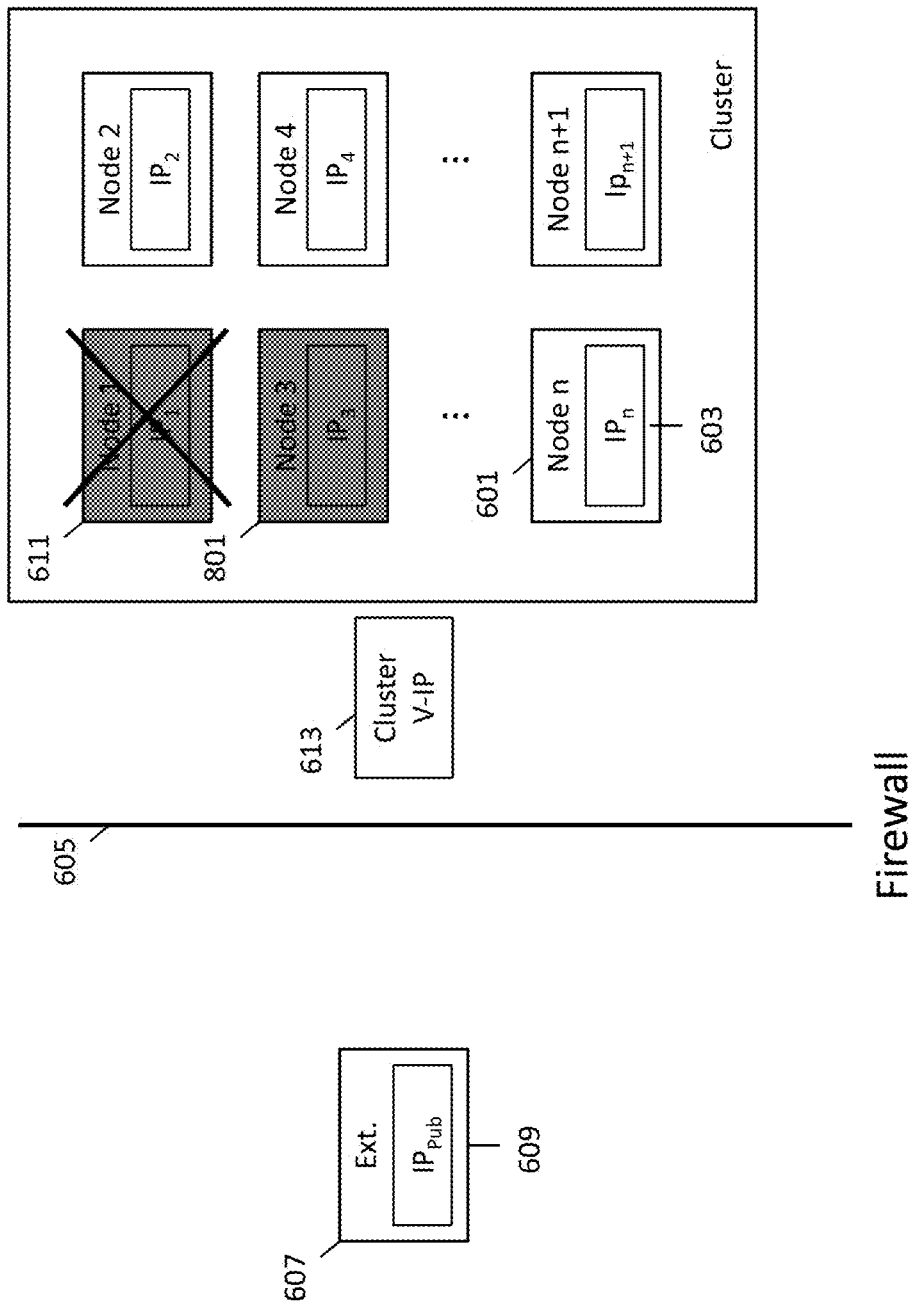

After identifying that the leader node 611 has failed, leadership election is again performed to elect a new leader node 801 (node 3) as illustrated in FIG. 8B. Election of the new leader node 801 may occur in the same manner as election of failed leader node 611 and as described above in FIG. 4. Alternatively, other leadership election schemes may be used to elect the new leader node 801. The newly elected leader node 801 will replace the failed leader node 611 and take on the responsibility of providing external access to the cluster of nodes and directing external communications from the external entity 607 to the appropriate nodes 601 within the cluster.

Figure 8C:
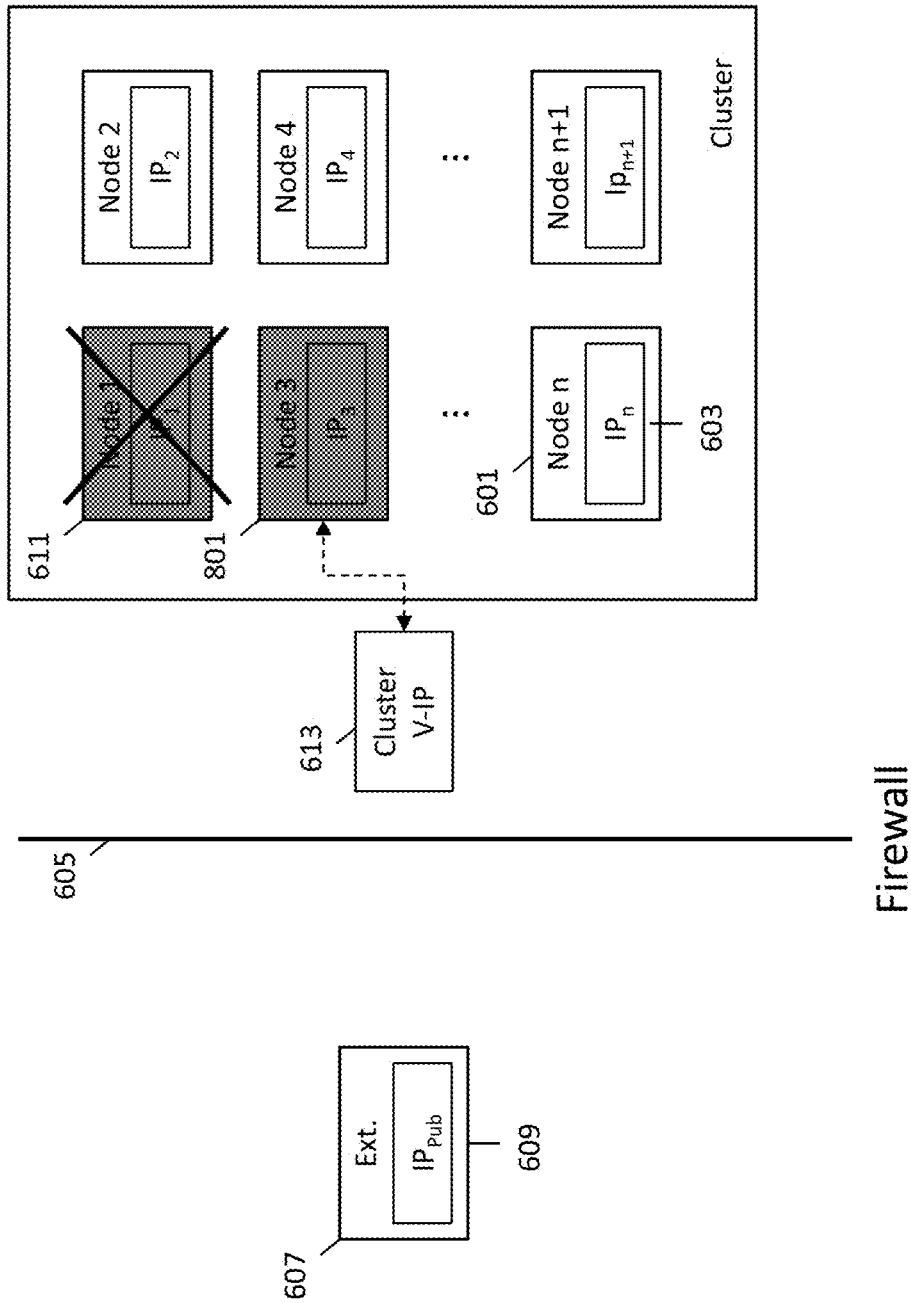

The cluster virtual IP address 613 that was previously assigned to the failed leader node 611 is then assigned to the new leader node 801 as illustrated in FIG. 8C. By assigning the previously assigned cluster virtual IP address 613 to the new leader node 801, external communication with the cluster through the new leader node 801 may still be accomplished using the same cluster virtual IP address 613. This avoids the need to provide a different IP address each time a different leader node is elected for the cluster, thereby simplifying the process for providing external access to the cluster.

Figure 8D:
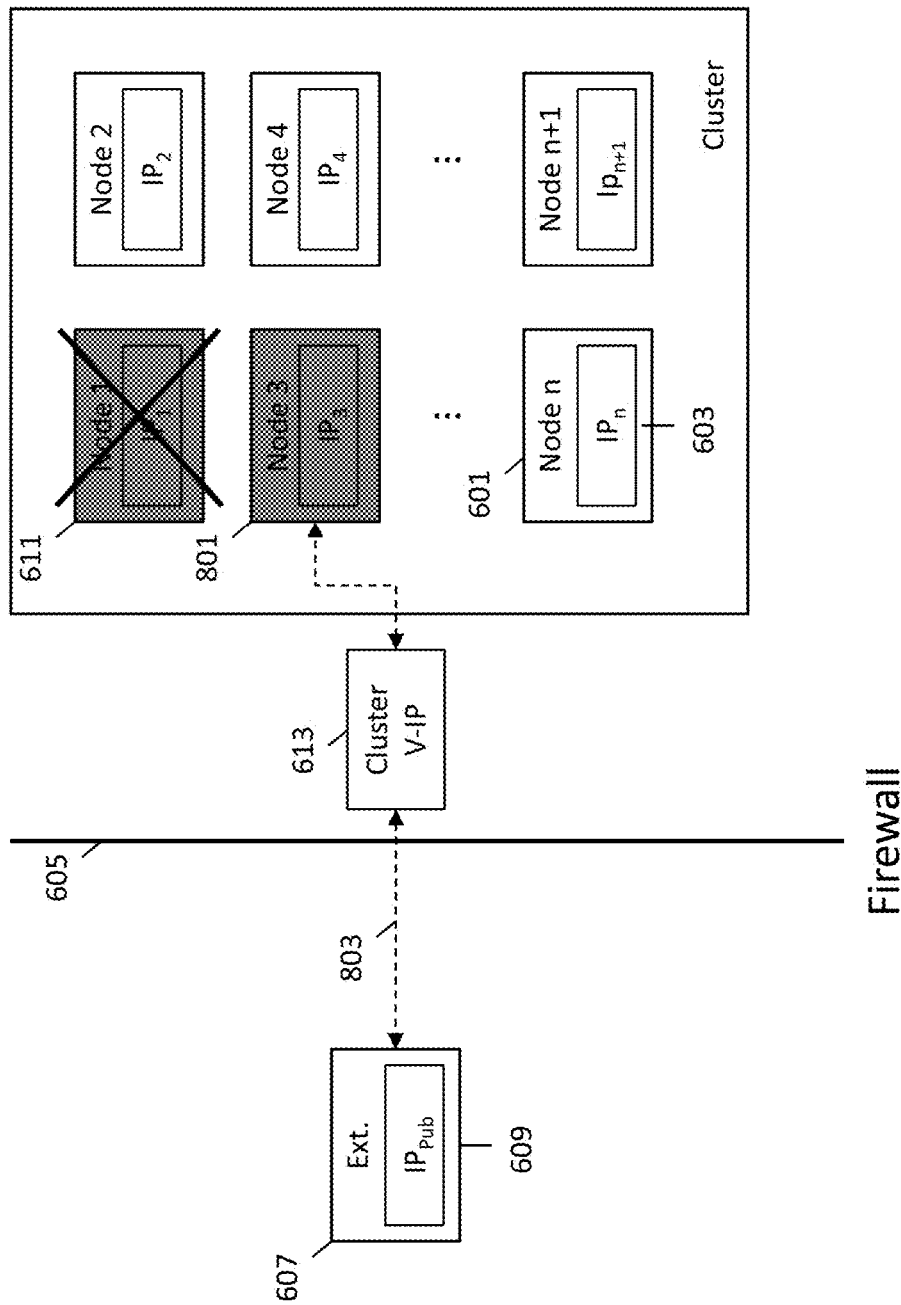

Finally, the new leader node 801 generates another reverse tunnel 803 to allow for the external entity 607 to communicate with the cluster as illustrated in FIG. 8D and as depicted by the dashed arrows between the external entity 607 and the cluster virtual IP address 613. Because the previously elected leader node 611 has failed, the reverse tunnel 615 generated by the previously elected leader node 611 is no longer operational. Thus, the newly elected leader node 801 must generate another reverse tunnel 803 to allow for the external entity 607 to communicate with the cluster. The newly elected leader node 801 may generate the reverse tunnel 803 in the same manner as described above for the previously elected leader node 611.

Because the newly elected leader node 801 utilizes the same cluster virtual IP address 613 as the previously elected leader node 611, the reverse tunnel 803 generated by the newly elected leader node 801 will utilize the same cluster virtual IP address 613 as the reverse tunnel generated 615 by the previously elected leader node 611. Similarly, because the newly elected leader node 801 belongs to the same cluster as the previously elected leader node 611, the port number at the external entity through which the external entity 607 may communicate with the newly elected leader node 801 may remain the same as the port number used in conjunction with the previously elected leader node 611.

After the newly elected leader node 801 has generated the reverse tunnel 803 for allowing the external entity 607 to communicate with the cluster, monitoring may continue to occur in the manner described above.

System Architecture

Figure 9:
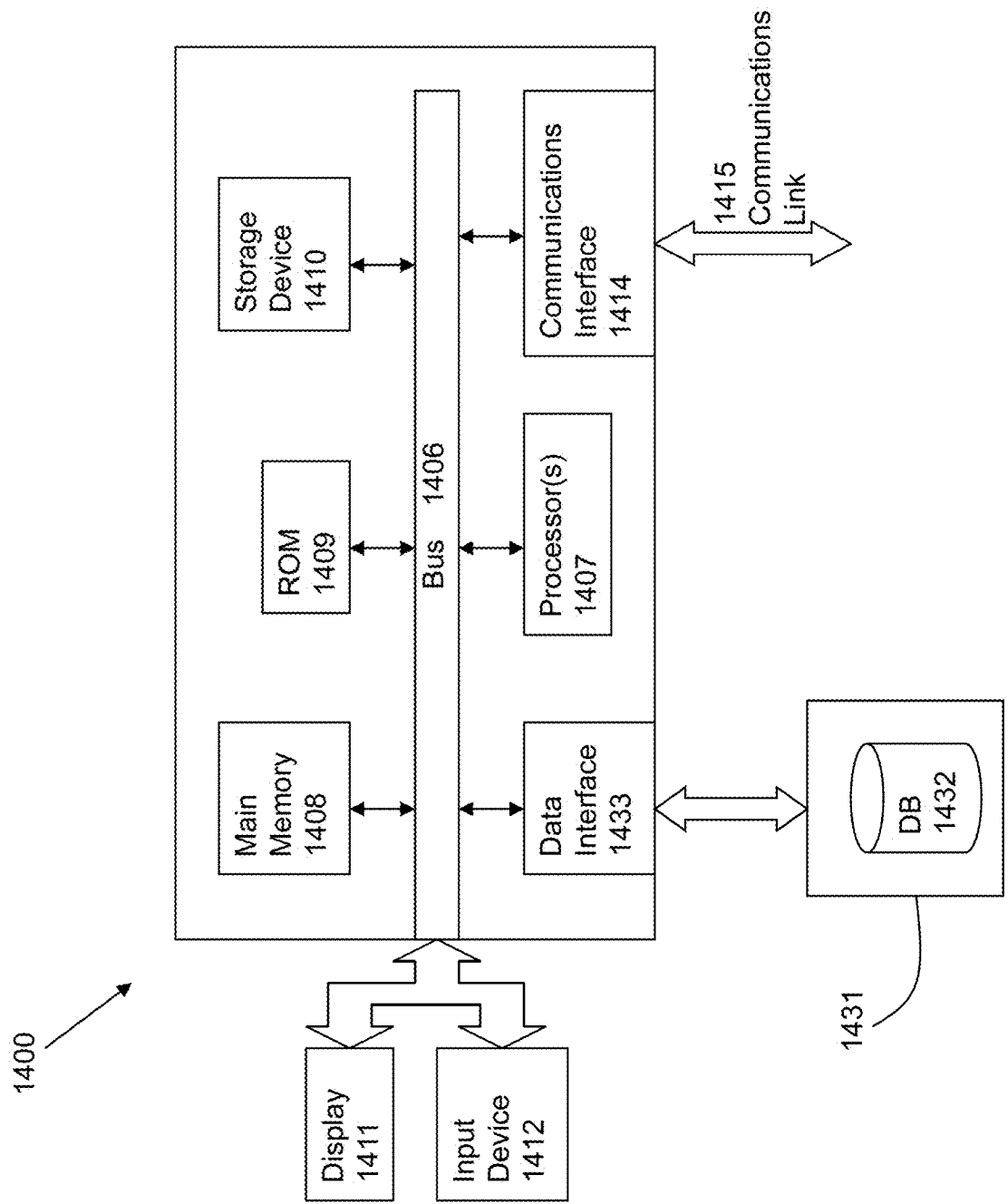
FIG. 9 is a block diagram of an illustrative computing system suitable for implementing an embodiment of the present invention.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A non-transitory computer readable medium having stored thereon a sequence of instructions which, when executed by a processor causes a set of acts, the set of acts comprising:
   electing a leader node from a cluster of nodes within a secured networked virtualization environment, respective nodes of the cluster of nodes each having an IP address;
   assigning a cluster virtual IP address to the leader node, the cluster virtual IP address being different from the IP address of the leader node; and
   generating a reverse tunnel with at least the cluster virtual IP address, wherein the reverse tunnel gives a node external to the secured networked virtualization environment access to the secured networked virtualization environment.

2. The computer readable medium of claim 1, wherein electing the leader node is performed by electing a first node corresponding to a first position in a queue as the leader node, wherein the queue is populated based on an order of receipt of heartbeat responses.

3. The computer readable medium of claim 1, wherein the IP address for each of the respective nodes comprise a private IP address and communications within the secured networked virtualization environment utilize a corresponding private IP address.

4. The computer readable medium of claim 1, wherein generating the reverse tunnel comprises identifying, by the leader node, a port number at the node external to the secured networked virtualization environment through which the node external to the secured networked virtualization environment is to communicate with the leader node.

5. The computer readable medium of claim 1, wherein generating the reverse tunnel comprises identifying a port number at the node external to the secured networked virtualization environment by requesting the node external to the secured networked virtualization environment for an available port number and receiving the available port number from the node external to the secured networked virtualization environment.

6. The computer readable medium of claim 1, wherein generating the reverse tunnel comprises performing a secured shell (SSH) command using a port number, the cluster virtual IP address and a public SSH key for the node external to the secured networked virtualization environment.

7. The computer readable medium of claim 1, wherein the node external to the secured networked virtualization environment is identified by iterating over a list of external entities associated with the secured networked virtualization environment.

8. The computer readable medium of claim 1, wherein a list of external entities associated with the secured networked virtualization environment is updated by requesting a current external entity from the list of external entities for an updated list of external entities and modifying the list of external entities to add or remove an external entity.

9. The computer readable medium of claim 1, wherein a list of external entities associated with the secured networked virtualization environment is assigned to the secured networked virtualization environment based on a unique identifier for the secured networked virtualization environment.

10. The computer readable medium of claim 1, wherein a node of the cluster of nodes present storage aggregated from a plurality of storage devices spread across the cluster of nodes.

11. A method, comprising:
    electing a leader node from a cluster of nodes within a secured networked virtualization environment, respective nodes of the cluster of nodes each having an IP address;
    assigning a cluster virtual IP address to the leader node, the cluster virtual IP address being different from the IP address of the leader node; and
    generating a reverse tunnel with at least the cluster virtual IP address, wherein the reverse tunnel gives a node external to the secured networked virtualization environment access to the secured networked virtualization environment.

12. The method of claim 11, wherein electing the leader node is performed by electing a first node corresponding to a first position in a queue as the leader node, wherein the queue is populated based on an order of receipt of heartbeat responses.

13. The method of claim 11, wherein the IP address for each of the respective nodes comprise a private IP address and communications within the secured networked virtualization environment utilize a corresponding private IP address.

14. The method of claim 11, wherein generating the reverse tunnel comprises identifying, by the leader node, a port number at the node external to the secured networked virtualization environment through which the node external to the secured networked virtualization environment is to communicate with the leader node.

15. The method of claim 11, wherein generating the reverse tunnel comprises identifying a port number at the node external to the secured networked virtualization environment by requesting the node external to the secured networked virtualization environment for an available port number and receiving the available port number from the node external to the secured networked virtualization environment.

16. The method of claim 11, wherein generating the reverse tunnel comprises performing a secured shell (SSH) command using a port number, the cluster virtual IP address and a public SSH key for the node external to the secured networked virtualization environment.

17. The method of claim 11, wherein a list of external entities associated with the secured networked virtualization environment is updated by requesting a current external entity from the list of external entities for an updated list of external entities and modifying the list of external entities to add or remove an external entity.

18. The method of claim 11, wherein a list of external entities associated with the secured networked virtualization environment is assigned to the secured networked virtualization environment based on a unique identifier for the secured networked virtualization environment.

19. The method of claim 11, wherein a node of the cluster of nodes present storage aggregated from a plurality of storage devices spread across the cluster of nodes.

20. The method of claim 11, wherein the node external to the secured networked virtualization environment is identified by iterating over a list of external entities associated with the secured networked virtualization environment.

21. A system comprising:
    a memory to hold a sequence of instructions; and
    a processor to execute the sequence of instructions, which when executed cause a set of acts, the set of acts comprising:
        electing a leader node from a cluster of nodes within a secured networked virtualization environment, respective nodes of the cluster of nodes each having an IP address;
        assigning a cluster virtual IP address to the leader node, the cluster virtual IP address being different from the IP address of the leader node; and
        generating a reverse tunnel with at least the cluster virtual IP address, wherein the reverse tunnel gives a node external to the secured networked virtualization environment access to the secured networked virtualization environment.

22. The system of claim 21, wherein electing the leader node is performed by electing a first node corresponding to a first position in a queue as the leader node, wherein the queue is populated based on an order of receipt of heartbeat responses.

23. The system of claim 21, wherein the IP address for each of the respective nodes comprise a private IP address and communications within the secured networked virtualization environment utilize a corresponding private IP address.

24. The system of claim 21, wherein generating the reverse tunnel comprises identifying, by the leader node, a port number at the node external to the secured networked virtualization environment through which the node external to the secured networked virtualization environment is to communicate with the leader node.

25. The system of claim 21, wherein generating the reverse tunnel comprises identifying a port number at the node external to the secured networked virtualization environment by requesting the node external to the secured networked virtualization environment for an available port number and receiving the available port number from the node external to the secured networked virtualization environment.

26. The system of claim 21, wherein a list of external entities associated with the secured networked virtualization environment is updated by requesting a current external entity from the list of external entities for an updated list of external entities and modifying the list of external entities to add or remove an external entity.

27. The system of claim 21, wherein a list of external entities associated with the secured networked virtualization environment is assigned to the secured networked virtualization environment based on a unique identifier for the secured networked virtualization environment.

28. The system of claim 21, wherein a node of the cluster of nodes present storage aggregated from a plurality of storage devices spread across the cluster of nodes.

29. The system of claim 21, wherein generating the reverse tunnel comprises performing a secured shell (SSH) command using a port number, the cluster virtual IP address and a public SSH key for the node external to the secured networked virtualization environment.

30. The system of claim 21, wherein the node external to the secured networked virtualization environment is identified by iterating over a list of external entities associated with the secured networked virtualization environment.

* * * * *